(12) United States Patent
Steffanson

(10) Patent No.: US 10,585,002 B2
(45) Date of Patent: Mar. 10, 2020

(54) MICROMECHANICAL DEVICE FOR ELECTROMAGNETIC RADIATION SENSING

(71) Applicant: MP High Tech Solutions Pty Ltd, Eveleigh (AU)

(72) Inventor: Marek Steffanson, Mosman (AU)

(73) Assignee: MP High Tech Solutions Pty Ltd, Eveleigh, NSW (AU)

( * ) Notice: Subject to any disclaimer, the term of this patent is extended or adjusted under 35 U.S.C. 154(b) by 0 days.

(21) Appl. No.: 15/804,607

(22) Filed: Nov. 6, 2017

(65) Prior Publication Data
US 2018/0073931 A1    Mar. 15, 2018

Related U.S. Application Data

(63) Continuation of application No. 14/810,363, filed on Jul. 27, 2015, now Pat. No. 9,810,581.
(Continued)

(51) Int. Cl.
*G01J 5/20* (2006.01)
*G01J 5/10* (2006.01)
(Continued)

(52) U.S. Cl.
CPC ............. *G01J 5/20* (2013.01); *G01J 5/023* (2013.01); *G01J 5/024* (2013.01); *G01J 5/0225* (2013.01);
(Continued)

(58) Field of Classification Search
None
See application file for complete search history.

(56) References Cited

U.S. PATENT DOCUMENTS

| | | |
|---|---|---|
| 3,896,309 A | 7/1975 | Halsor et al. |
| 5,929,440 A | 7/1999 | Fisher |

(Continued)

FOREIGN PATENT DOCUMENTS

| | | |
|---|---|---|
| CN | 103033926 A | 4/2013 |
| EP | 1692550 | 2/2012 |
| WO | 1997026556 | 7/1997 |

OTHER PUBLICATIONS

European Patent Application No. 15811698.8, extended European Search Report, dated Feb. 13, 2018.
(Continued)

*Primary Examiner* — Edwin C Gunberg
(74) *Attorney, Agent, or Firm* — Greenberg Traurig

(57) ABSTRACT

Systems, methods, and apparatus for providing an improved electromagnetic radiation sensing micromechanical device to be utilized in high pixel-density pixel sensor arrays. The device includes an improved design for improved and adjustable performance through simple geometric or fabrication means. Furthermore, the design of the device lends itself to simple micromechanical manufacturing procedures. Additionally, the manufacturing procedures include a method to enable high uniformity and high yield sensor arrays. Arrays of the device can be utilized as IR imaging detectors for use in applications such as human presence detection, nonvisual environment monitoring, security and safety, surveillance, energy monitoring, fire detection and people counting.

20 Claims, 22 Drawing Sheets

Related U.S. Application Data

(60) Provisional application No. 62/029,994, filed on Jul. 28, 2014.

(51) Int. Cl.
*G01J 5/02* (2006.01)
*G01J 5/40* (2006.01)
*G01J 5/00* (2006.01)

(52) U.S. Cl.
CPC . *G01J 5/10* (2013.01); *G01J 5/40* (2013.01); *G01J 2005/0077* (2013.01); *G01J 2005/106* (2013.01)

(56) References Cited

U.S. PATENT DOCUMENTS

| | | | |
|---|---|---|---|
| 6,031,619 | A | 2/2000 | Wilkens et al. |
| 6,208,413 | B1 | 3/2001 | Diehl et al. |
| 6,242,738 | B1 | 6/2001 | Ju |
| 6,339,219 | B1 * | 1/2002 | Ishizuya ............... G01J 5/40 250/330 |
| 6,444,972 | B1 | 9/2002 | Datskos et al. |
| 6,835,932 | B2 * | 12/2004 | Ishizuya ............... B81B 3/0081 250/336.1 |
| 7,064,883 | B2 | 6/2006 | Payne et al. |
| 7,646,494 | B2 | 1/2010 | Lechuga Gomez et al. |
| 7,705,307 | B1 | 4/2010 | Zhao et al. |
| 7,705,309 | B1 | 4/2010 | Jin et al. |
| 7,825,381 | B2 | 11/2010 | Erdtmann et al. |
| 8,242,446 | B2 | 8/2012 | Fleury-Frenette et al. |
| 8,283,256 | B1 | 10/2012 | Pan et al. |
| 8,440,972 | B2 | 5/2013 | Streuber et al. |
| 8,624,187 | B2 | 1/2014 | Urey et al. |
| 9,041,990 | B2 | 5/2015 | Schreiber |
| 9,810,581 | B1 | 11/2017 | Steffanson |
| 9,851,256 | B2 | 12/2017 | Steffanson et al. |
| 9,857,229 | B1 | 1/2018 | Steffanson |
| 10,107,691 | B2 | 10/2018 | Steffanson |
| 10,422,698 | B2 | 9/2019 | Steffanson et al. |
| 2002/0036265 | A1 | 3/2002 | Ishizuya et al. |
| 2004/0147056 | A1 | 7/2004 | McKinnell et al. |
| 2006/0075803 | A1 | 4/2006 | Boisen et al. |
| 2006/0131500 | A1 | 6/2006 | Dalakos et al. |
| 2007/0196944 | A1 | 8/2007 | Chou et al. |
| 2007/0296838 | A1 | 12/2007 | Erdtmann |
| 2008/0230698 | A1 | 9/2008 | Simelgor et al. |
| 2009/0001271 | A1 | 1/2009 | Erdtmann et al. |
| 2009/0238236 | A1 | 9/2009 | Fleury-Frenette et al. |
| 2010/0148283 | A1 | 6/2010 | Shih |
| 2011/0127073 | A1 | 6/2011 | Ryu et al. |
| 2011/0159638 | A1 | 6/2011 | Wang |
| 2011/0279681 | A1 | 11/2011 | Cabib et al. |
| 2011/0291225 | A1 | 12/2011 | Klatt |
| 2012/0032082 | A1 | 2/2012 | Pradere et al. |
| 2013/0033734 | A1 | 2/2013 | Schreiber |
| 2015/0061020 | A1 | 3/2015 | Yokoyama et al. |
| 2015/0377711 | A1 | 12/2015 | Steffanson et al. |
| 2018/0100768 | A1 | 4/2018 | Steffanson et al. |
| 2018/0106682 | A1 | 4/2018 | Steffanson |

OTHER PUBLICATIONS

International Patent Application PCT/US2018/037217, International Search Report and Written Opinion, dated Sep. 27, 2018. 2013.

Zhao et al. "Imaging and Characteristics of the Bimaterial Microcantilever FPA Fabricated using Bulk Silicon Processes" Chin.Phys.Lett. vol. 29, No. 5, 2012 p. 058502-1-058502-4.

Cheng et al. "Optical readout sensitivity of deformed microreflector for uncooled infrared detector: theoretical model and experimental validation" Nov. 2009, J. Opt. Soc. Am. A, vol. 26, No. 11 p. 2353-2361.

Corbeil et al., "Self-leveling" uncooled microcantilever thermal detector, Applied Physics Letters, Aug. 12, 2002, vol. 81, No. 7, pp. 1306-1308.

D. Grbovic et al., Arrays of SiO2 substrate-free micromechanical uncooled infrared and terahertz detectors, Journal of Applied Physics 104, 054508 (2008).

Grbovic, Fabrication of Bi-material MEMS detector arrays for THz imaging, Proc. of SPIE vol. 7311 731108, 2009.

Grbovic, Imaging by Detection of Infrared Photons Using Arrays of Uncooled Micromechanical Detectors, May 2008.

Grbovic, Progress with MEMS Based UGS (IR/THz), Proc. of SPIE vol. 6963, 696317, (2008).

International Patent Application PCT/US15/37981, International Search Report and Written Opinion, dated Oct. 13, 2015.

Miao et al., Uncooled IR imaging using optomechanical detectors, ScienceDirect Ultramicroscopy 107 (2007), pp. 610-616.

Toy et al. "Uncooled infrared thermo-mechanical detector array: Design, fabrication and testing", Feb. 2009, Sensors and Actuators A: Physical, p. 88-94.

Wang et al., IR imaging using a cantilever-based focal plane array fabricated by deep reactive ion etching technique, Applied Physics Letters 91, 054109 (2007 ).

Yu et al. Design and fabrication of high sensitivity focal plane array for uncooled IR imaging, pub. Mar. 25, 2008, Journal of Micromechanics and Microengineering, p. 1-8.

* cited by examiner

MICROMECHANICAL DEVICE FOR ELECTROMAGNETIC RADIATION SENSING

RELATED APPLICATIONS

The present application is a continuation application of U.S. patent application Ser. No. 14/810,363, filed Jul. 27, 2015 and issued on Nov. 7, 2017 as U.S. Pat. No. 9,810,581, which claims priority to Prov. U.S. Pat. App. Ser. No. 62/029,994, filed Jul. 28, 2014 and entitled "Micromechanical Devices for Electromagnetic Radiation Sensing and Methods to Produce the Same", the entire disclosures of which applications are hereby incorporated herein by reference.

The present application relates to Prov. U.S. Pat. App. Ser. No. 62/004,805, filed May 29, 2014 and entitled "Micromechanical Devices for Electromagnetic Radiation Sensing and Methods to Produce the Same", Prov. U.S. Pat. App. Ser. No. 62/017,724, filed Jun. 26, 2014 and entitled "Apparatus and Method for Electromagnetic Radiation Sensing," and Prov. U.S. Pat. App. Ser. No. 62/019,823, filed Jul. 1, 2014 and entitled "Micromechanical Devices for Electromagnetic Radiation Sensing and Methods to Produce the Same," the entire disclosures of which applications are hereby incorporated herein by reference.

The present application relates to U.S. patent application Ser. No. 14/750,403, filed Jun. 25, 2015 and entitled "Apparatus and Method for Electromagnetic Radiation Sensing", and Prov. U.S. Pat. App. Ser. No. 62/184,098, filed Jun. 24, 2015 and entitled "Fabrication Method for Micromechanical Sensors", the entire disclosures of which applications are hereby incorporated herein by reference.

The present application relates to U.S. patent application Ser. No. 14/788,286, filed Jun. 30, 2015 and entitled "Micromechanical Device for Electromagnetic Radiation Sensing", the entire disclosure of which is hereby incorporated herein by reference.

FIELD OF THE TECHNOLOGY

At least some embodiments disclosed herein relate to electromagnetic radiation detection in general and more particularly but not limited to infrared radiation sensing micromechanical devices for environmental and human monitoring.

BACKGROUND

U.S. Pat. No. 5,929,440 discloses an electromagnetic radiation detector that has an array of multi-layered cantilevers. Each of the cantilevers is configured to absorb electromagnetic radiation to generate heat and thus bend under the heat proportionately to the amount of absorbed electromagnetic radiation. The cantilevers are illuminated and light reflected by the bent cantilevers are sensed to determine the amount of electromagnetic radiation.

U.S. Pat. No. 8,242,446 discloses a micromechanical sensor having a micromechanical oscillator and optical readout means for detecting a displacement of the oscillator.

U.S. Pat. Nos. 6,835,932, 7,825,381 and 8,440,972 disclose radiation detection pixels each having cantilevered attachment, with differences in coefficient of thermal expansion of materials of the pixels causing deflection of parts of the pixels due to heating from absorption of radiation.

The entire disclosures of above discussed patent documents are hereby incorporated herein by reference.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

The embodiments are illustrated by way of example and not limitation in the figures of the accompanying drawings in which like references indicate similar elements.

Like reference numbers and designations in the various drawings indicate like elements.

DETAILED DESCRIPTION

Figure 1:
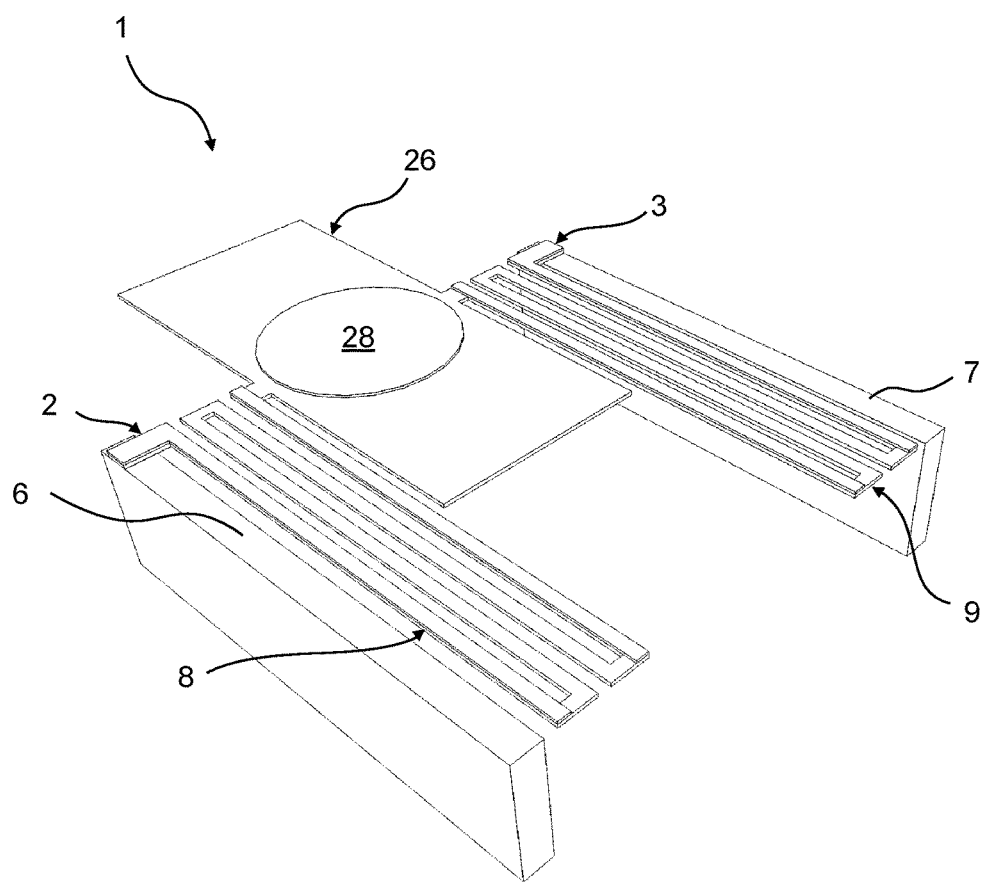
FIG. 1 shows an example micromechanical pixel in a perspective view.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Nonvisual environment monitoring and monitoring of human presence can be utilized in applications for security and safety, energy savings, fire detection, human counting and behavior analysis. For example, infrared radiation sensing technology in general and more particularly uncooled thermal sensing and imaging can be used for such applications.

At least some embodiments disclosed herein provide systems, and apparatus for providing an electromagnetic radiation sensing micromechanical device that includes an improved design for simple and potentially inexpensive micromechanical manufacturing procedures. The device can be utilized in high pixel-density pixel sensor arrays. The device can include features, which allow performance variations and which can exhibit low sensor characteristic variations as a function of operational temperature fluctuations. Arrays of the device can be utilized as IR imaging detectors for use in applications such as human presence detection, nonvisual environment monitoring, remote temperature sensing, security and safety, surveillance, energy monitoring, fire detection and people counting.

Further details are set forth in the accompanying drawings and the description below. Other features, aspects, and advantages will become apparent from the description, the drawings, and the claims. The relative dimensions of the drawings may not be drawn to scale.

Nonvisual environment monitoring and monitoring of human presence can be beneficial applications for security and safety, energy savings, fire detection, human counting and behavior analysis. One technology that can be used for these kinds of applications is infrared technology, in particular uncooled thermal sensing and imaging. Every object in our environment has a unique thermal footprint and therefore thermal sensing offers detection of human presents in an enclosed environment with a very high accuracy and negligible false alarm rate. Human body temperature and emissivity in the long wave infrared band is in most cases distinguishably higher than the thermal footprint of typical indoor and some outdoor environmental surroundings, due to a thermal contrast. Conventional thermal sensing and imaging technologies offer good spatial imaging resolution at a high cost or have insufficient spatial resolution (sensing) at low cost. Some thermal sensing devices can be based on thermopile or pyro-electric array sensors. These devices, however, possess in most cases limited spatial resolution of e.g. 8×8=64 pixels, which is in most cases insufficient for human sensing at a distance beyond a short distance (e.g., a few of feet). Microbolometer technology based thermal cameras offer good imaging performance, at higher cost. A thermal sensor with a limited spatial resolution of around 30×30 infrared pixels would be sufficient to detect humans at typical indoor distances (e.g., up to 15 feet) without revealing the identity of the individual. The latter aspect of environmental and human monitoring is of general interest with regards to privacy protection. A need exists for ubiquitous spatially limited resolution infrared sensors and imagers at a low-cost price.

One example of a potentially inexpensive thermal imager with a limited spatial resolution is based on an uncooled thermomechanical bimaterial microelement, which converts incident infrared radiation into a micromechanical displacement. The micromechanical response is captured optically by an optical imaging system and converted into a readable electrical signal for further image processing and thermal image generation. Such a sensing device includes two separate systems, firstly, one or a multiplicity of thermomechanical bimaterial microelements in a 2D array configuration with the ability to convert incident radiation into micromechanical displacement through the bimaterial effect and secondly, an optical system that has the ability to convert the micromechanical displacements into an electronically readable signal. A bimaterial microelement based imager including an optical readout has a low-cost potential through utilizing standard bulk materials in the microfabrication process and utilizing off the shelf components for the optical readout. However most of currently known implementations include a thermomechanical bimaterial microelement (="micromechanical pixel/device") design that lends itself to relatively complex and non-economic microfabrication procedure due to the utilization of a sacrificial layer technology. Some currently known enhanced implementations utilizing a substrate removal in order to create free standing micromechanical pixels, without the usage of sacrificial layers, offer insufficient performance in terms of pixel density arrangement or parasitic heat transfer effects. Further, some implementations include a rather voluminous optical system that is bound to strict tolerances in order to detect nanometer displacements of the micromechanical pixels (e.g. Z. Guo, et al. in "Performance analysis of microcantilever arrays for optical readout uncooled infrared imaging", in Sensors and Actuators A 137 (2007) 13-19). Extending the tolerances of the optical system can result in a less sensitive optical detection of the micromechanical displacements, although it can also result in lower manufacturing costs. In some implementations, a low-cost, low-sensitive optical readout system can be compensated through a large responsivity of the micromechanical pixel.

The responsivity R of a micromechanical pixel is the micromechanical response (maximal net displacement z or sometimes referred to as angular displacement θ) upon absorbed incident radiation power $P_0$ has following relation of $R=z/P_0$ The responsivity can be increased through different variables. One of the most effective ones can be the increase of the bimaterial actuating cantilever overall length $l_b$ due to its cubic correlation with the displacement of the freestanding end ($z \propto l_b^2$). However, increasing the bimaterial length can result in increasing the overall pixel size, which can lead to microfabrication challenges in terms of microstructural out-of-plane deformations due to thin-film stress.

One embodiment disclosed herein includes a design of an improved micromechanical device that is less prone to fabrication-related thin-film stress-deformations of its sensitive reflector region. The device can be manufactured via a simplified microfabrication method that does not use a sacrificial layer. Hence the improved design of a radiation sensing micromechanical device is robust and has a very-low-cost manufacturing potential. Furthermore the design can exhibit large responsivity to widen the tolerance level of its optical readout system. This can result in lowering the overall fabrication and assembly cost of such radiation detecting device.

In one embodiment, the micromechanical device includes design feature that allows the device to be independent to environmental temperature fluctuations.

In one embodiment, the micromechanical device is configured to have a locally substrate-free high pixel density configuration while remaining a partial substrate heat sink.

In one embodiment, the micromechanical device is configured with a profile feature to compensate thin-film related deformations of the sensitive reflector area, hence may allow the usage of thinner films, resulting in higher sensitivities and eventually in higher imaging frame rates.

In one embodiment, a method is provided to adjust the performance characteristics of the device through additional thin-film implementation of conduction layer and absorption layer.

In one embodiment, the geometric relations in the micromechanical device is configured to adjusting the performance characteristics of the device.

In one embodiment, the implementation of an etch barrier layer enables a high manufacturing yield.

FIG. 1 shows an example micromechanical pixel 1 of one embodiment in a perspective view. The micromechanical pixel 1 includes a substantially rectangular absorption plate 26, which is connected along a central portion (e.g., at or near its width-wise centerline or line of symmetry) through a pair of supporting elements (e.g., meander-shaped legs 8 and 9), to two anchor elements 2 and 3 that are attached to the substrate portions 6 and 7. The micromechanical pixel 1 is substantially symmetrical along its length-wise centerline or line of symmetry. The micromechanical pixel 1 is supported by the two anchor elements 2 and 3 between partial substrates 6 and 7 respectively. The partial substrates 6 and 7 have been initially a solid substrate where the micromechanical pixel 1 has been created upon through thin-film deposition and structuring. At a release etch step the solid substrate has been partially removed allowing the micromechanical pixel 1 to be freestanding over the substrate 6 and 7 via the anchor elements 2 and 3.

The absorber plate 26 includes a reflector 28 on its front surface. The geometry of the reflector 28 can be of any shape or size. The reflector 28 is part of the micromechanical pixel 1, positioned on a part of the micromechanical pixel 1, where its micromechanical response to radiation-induced temperature increase possesses a maximum angular change. The reflector 28 has a surface configured to reflect incident optical readout light within the optical readout mechanism (optical lever method), which converts the radiation-induced micromechanical pixel 1 movements into the movement of a light spot that can be detected via electrically. Further examples and details about the optical readout can be found in U.S. patent application Ser. No. 14/750,403, filed Jun. 25, 2015 and entitled "Apparatus and Method for Electromagnetic Radiation Sensing", the disclosure of which is hereby incorporated herein by reference. In one embodiment, the top surface of the absorber plate 26 is partially covered by the reflector 28 and partially free of the reflector 28 material. In one embodiment, the top surface of the absorber plate 26 reflects light less than the region of the reflector 28. The differences in rate of reflecting lights in the reflector 28 and the remaining part of the top surface allows the light spot reflected by the reflector 28 to be substantially defined by the shape and size of the reflector 28, instead of the overall shape and size of the absorber plate 26.

The mirror geometry and surface property, in particular the mirror flatness dictate its reflective properties, which have a large effect on the sensitivity of the optical system. In order to decrease the expenses of tight tolerances of the optical system a large micromechanical pixel's 1 responsivity and a high flatness of the reflector 28 are desired. Deformations and asymmetric curvatures of the reflector 28 are highly disadvantageous and can irritate the optical readout and can result in non-functionality of the optical readout system due to collimating, diverging, dispersing, shifting, etc. the reflected light path. Hence the absorber plate shall be substantially plane.

In FIG. 1, the line of the anchors fixating the absorber plate 26 with the legs passes through the center of the reflector 28 positioned on the absorber plate 26. The supporting elements (e.g., 8 and 9) connect the substrate 6 and 7 to the central portion of the absorption plate 26. In FIG. 1, the connecting points between the supporting elements (e.g., 8 and 9) and the absorption plate 26 forms a line passing through the center of the absorber plate 26. In FIG. 1, the connecting points between the supporting elements (e.g., 8 and 9) and substrate (e.g., 6 and 7) are also on that line.

The mirror position as illustrated in FIG. 1 is the least prone to fabrication-related thin-film stress deformations of the absorber plate 26 and therefore offers a more robust design for a simpler manufacturing process, which may include lower thin-film qualities including intrinsic stress.

Figure 2:
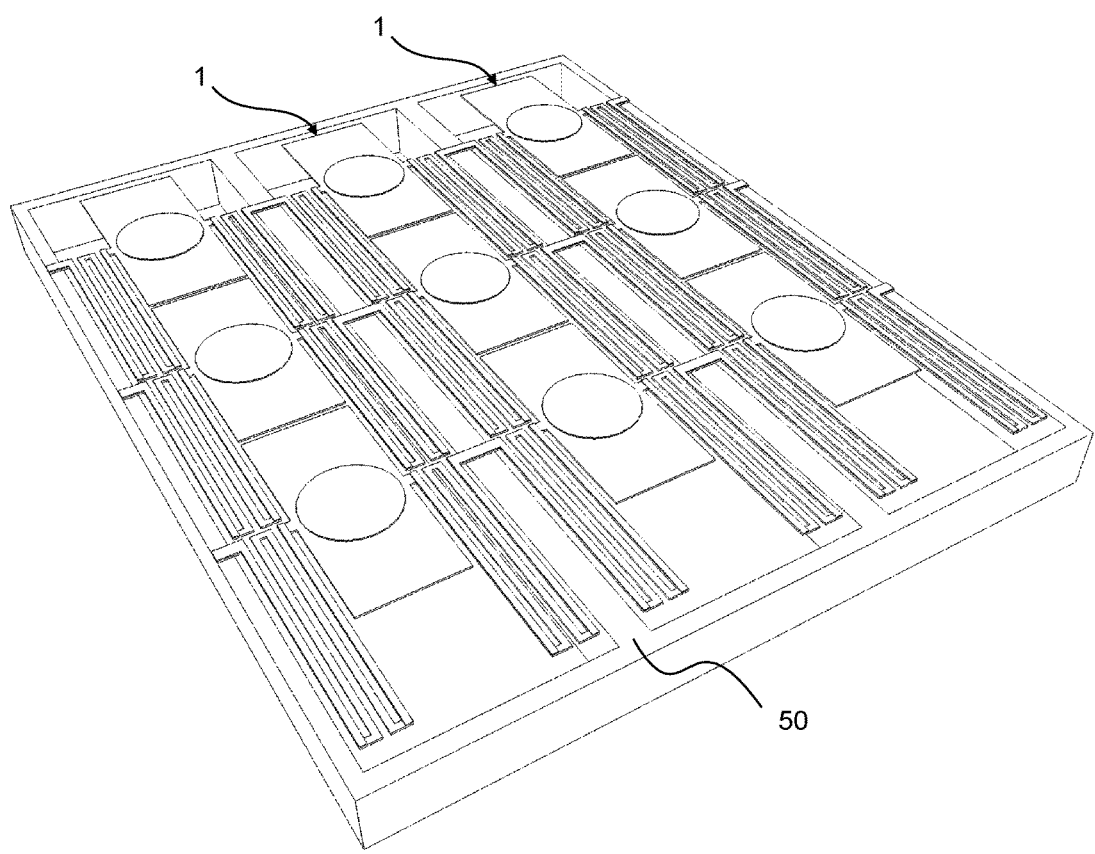
FIG. 2 shows an example of an array of example micromechanical pixels configured in a 3×3 planar arrangement in a perspective view.

FIG. 2 shows an example two-dimensional arrangement of a multiplicity of micromechanical pixels 1 configured in a focal plane array with substantially equal inter-pixel distances. This example embodiment shows an array of 3×3 pixels 1 in a high-density pixel arrangement. In FIG. 2, the micromechanical pixel 1 has a perpendicular anchor arrangement (e.g., the line of anchor points is perpendicular to the length-wise direction of the pixel) and is attached sideways (along its long side) to the supporting walls/frame 50 of the substrate. In one embodiment, the substrate frame 50 has been patterned in a grill-like arrangement with designated openings substantially perpendicular to the rotation axis of the pixels 1 and substantially matching the shape of the pixels 1 in order for them to be freestanding. FIG. 2 is only one schematic example of a micromechanical pixel array and the amount of pixels is not limited in any manner.

In one embodiment, a micromechanical pixel 1 includes anchor elements being positioned substantially parallel to the axis of rotation of the reflector 28, and further the pixel's 1 design to allow itself to be placed in a high pixel-density focal plane array arrangement with minimal gaps between adjacent pixels and further allowing a substantially equal distance from one center of a pixel to the center of any of its adjacent pixel. Furthermore, the patterning of the substrate has a grill-like arrangement with patterned openings matching the pixel arrangement to be freestanding and function accordingly.

Figure 3A:
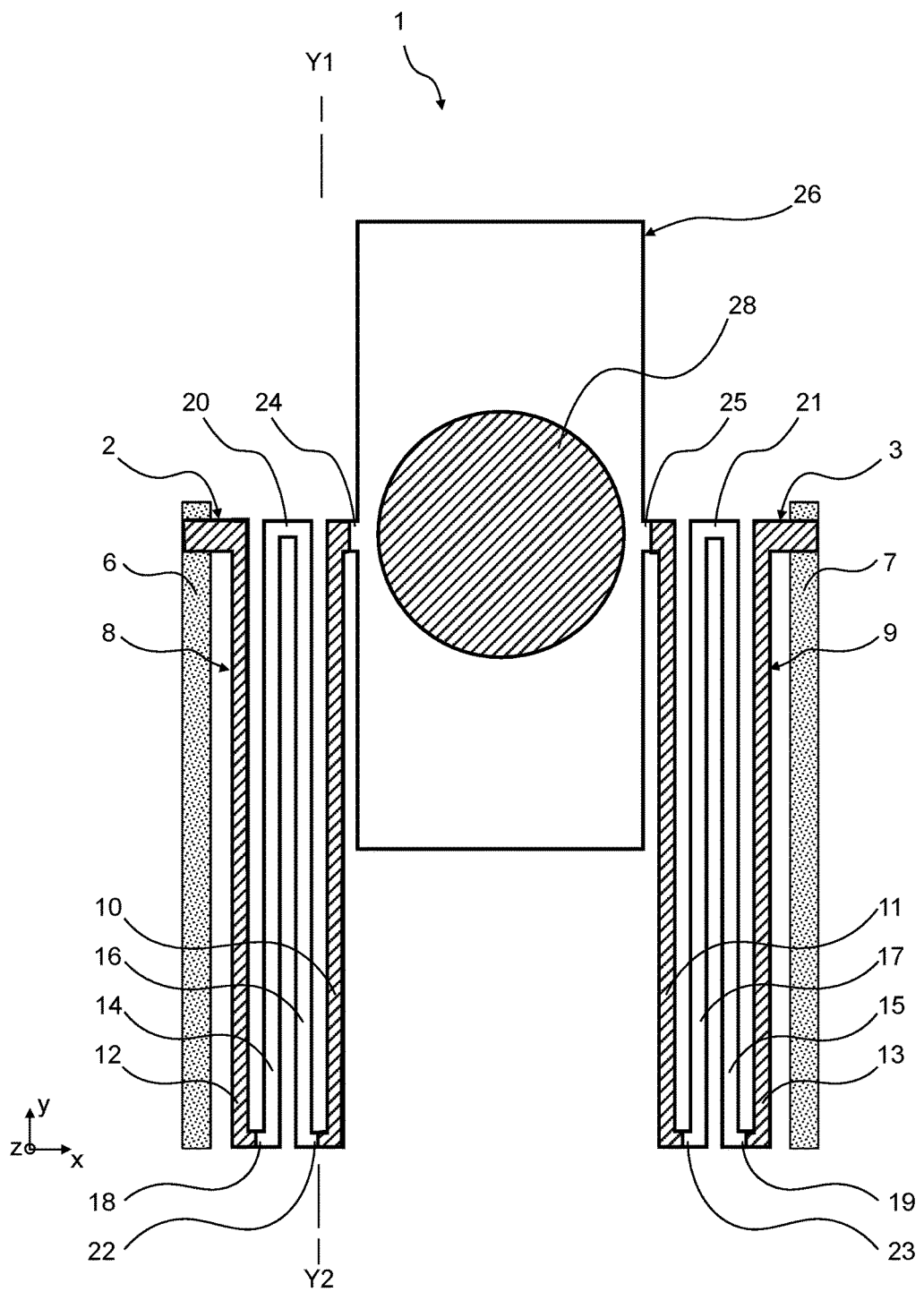
FIGS. 3a and 3b show another example micromechanical pixel in a top view.
Figure 3B:
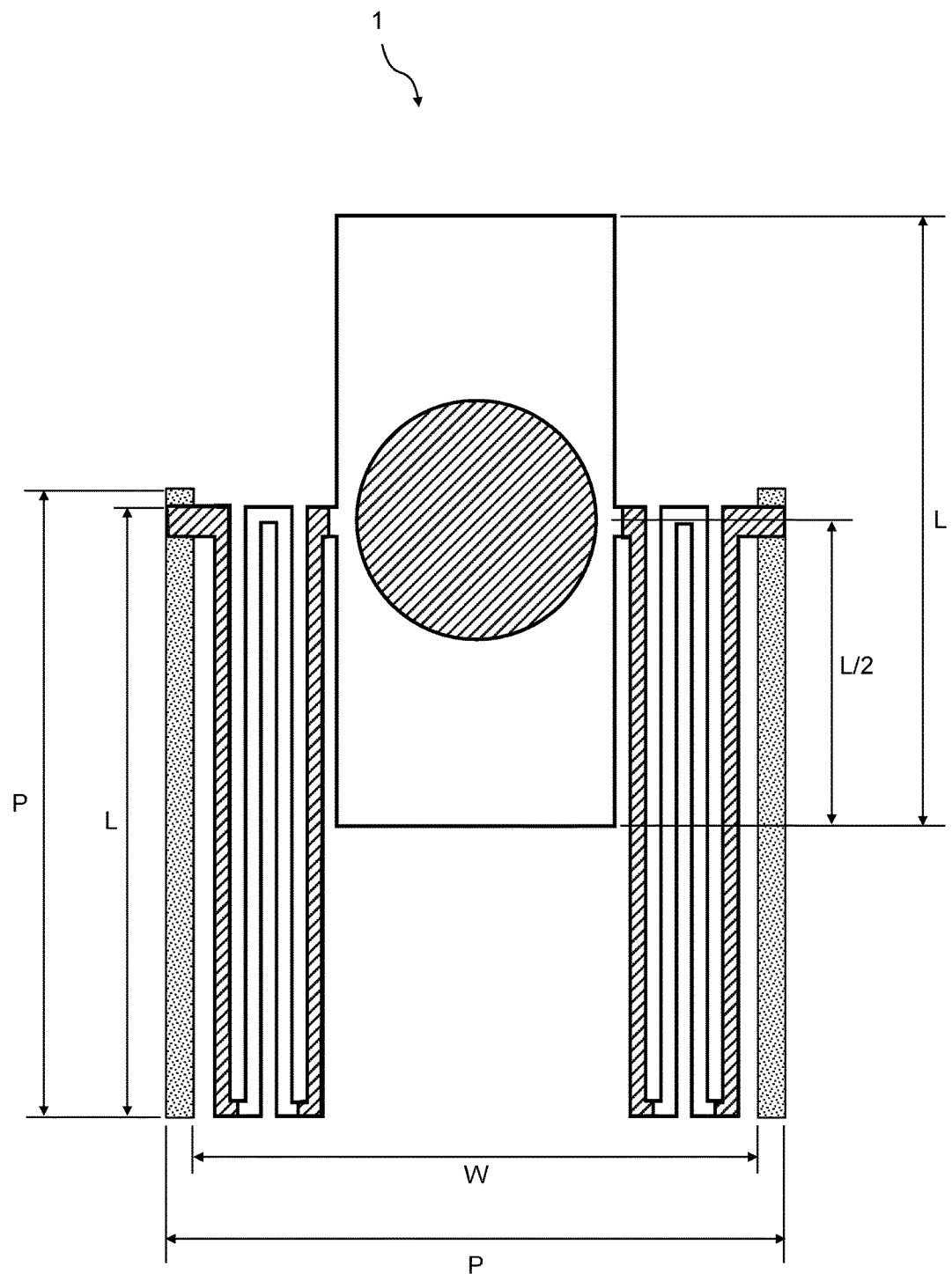

FIGS. 3a and 3b show a further example of a micromechanical pixel 1 of one embodiment in the top-view and in more detail. FIG. 3a displays the indications described in the sections below and FIG. 3b highlights some geometrical relations. For explanatory purposes the 2-dimensional embodiments include an x-y-z Cartesian coordinate system, with the micromechanical pixel's 1 supporting substrate plane being substantially positioned in the x-y-plane. The absorption plate 26 is configured to rotate along the direction of the x-axis. The width of the absorber plane 26 is substantially parallel to the x-axis. Y-axis is perpendicular to the x-axis with the absorber plate's length being substantial perpendicular to the y-axis. The absorber plate 26 is herein referred to as absorption plate or absorber/reflector plate/area, as it includes a reflector element 28 on its top surface. In the top-view embodiments different materials and depths are indicated with differently hatched surfaces in order to enable visual contrast between different material and topographic regions of the micromechanical pixel 1.

The micromechanical pixel 1 is created through thin-film deposition and structuring. The micromechanical pixel 1 includes a structural layer and a metallic thin-film layer. In addition to the structural layer and the metallic layer, the micromechanical pixel 1 can optionally include other layers, such as one or more conduction layers, and/or one or more absorption layers, and/or one or more etch stop layers.

In one embodiment, the structural layer is constructed with silicon-oxide (SiO or other chemical compound of any stoichiometry, such as $SiO_2$, $SiO_x$ or SiO), which can be deposited or grown via any thin-film deposition or growth method. SiO is an absorber in the long-wave infrared spectrum. The structural layer defines the micromechanical pixel's 1 geometry, i.e. the shape of the anchor elements and the legs and the absorber plate and has preferably a low coefficient of thermal expansion (CTE). The entire pixel geometry is defined with one micro-fabrication patterning step into the structural layer. A portion of the front facing surface of the absorption plate 26 is coated with a metallic thin-film layer, which forms the micromechanical pixel's reflector 28. The reflector 28 can be formed using a variety of optically reflective metals such as, but not limited to aluminum (Al) and gold (Au). In some implementations, an adhesion layer may also be used to attach the metallic thin-film layer to the structural layer. Other portions of the structural layer that are covered with a metallic thin-film layer include regions of the legs (the inner and outer bimaterial arms 10, 11 and 12, 13 respectively) and the anchor elements 2 and 3. These other portions do not function as optical readout light reflectors, but rather as bimaterial actuators and conduction layers. Metals can have a high CTE, high thermal conductivity and high reflectivity.

Micro-fabricated thin-films and thin-film compounds such as SiO and Al can exhibit fabrication-related intrinsic thin-film stress, which can lead to unwanted and unpredictable, and sometimes asymmetrical and random deformations of its freestanding elements. Although the micromechanical pixel 1 is a freestanding device in itself, its structural design allows it to divide into more specific freestanding elements, which have an anchor point and a freestanding end. In particular the absorber plate 26 forms a freestanding element, which is being in present disclosure symmetrically fixated in the middle of its long side by the left and right connection elements 24 and 25 respectively. In some implementations thin-film stress induced freestanding surfaces can deform asymmetrically and possess an elliptical-like profile, where the curvature can increase with the freestanding length. The length in which the curvature possesses an acceptable degree for its assigned functionality can be defined as critical length. For example an absorber plate can be relatively flat within 100 μm of its freestanding length from the fixation point. Such length is herein defined critical length and after 100 μm length the deformation can increase dramatically where the deformation would be unacceptable for e.g. a mirror to reflect parallel or collimated light accordingly.

As mentioned above one variable to increase the micromechanical pixel's 1 responsivity is to increase its effective bimaterial length by increasing its overall size. In some implementations pixel sizes of about 150 . . . 200 μm can provide sufficient responsivity to implement it in a relatively simple and inexpensive optical setup with a relative low sensitivity. If for example, an about 200 μm long absorber plate with a central reflector arrangement was attached at its outer corners, its freestanding part would be about 200 μm. If further the critical length was e.g. about 100 μm, then the reflector would be non-functional due to intolerable deformation. The present disclosure herein includes a fixation of the absorber plate with a central reflector at its center of the long side, effectively halving its maximum potential freestanding length. Above example in present disclosure would include a top and bottom freestanding part of maximum 100 μm each, being below the critical length. Hence the reflector could function accordingly because it would be positioned at an area of lowest potential deformation.

The above described geometrical proportions are visualized in FIG. 3b. The length L is the structural length of the micromechanical pixel 1—preferably the length of some individual parts of the legs and the length of the absorber plate. As indicated the absorber plate is attached at around L/2 to the designated connecting elements. The dimension P represents the pixel-pitch, which relates to the size required by one pixel if arranged in a plane array. The dimension W represents the width of the substrate opening between the two substrate rails, where in between the micromechanical pixel 1 is positioned in. The difference (P–L) defines the gap between adjacent legs and the gap between adjacent absorber plates of the micromechanical pixel 1 in y-direction, when arranged in an array. Preferably, the micromechanical pixel 1 is designed in such manner, that adjacent pixels in both the x- and the y-direction can have an equivalent pixel-to-pixel distance P.

Referring now to FIG. 3a the legs 8 and 9 are arranged on each long side of the absorption plate 26. In some implementations, such as the one shown in FIG. 3a, each leg 8 and 9 can include four parallel parts. Often these parts are referred to as arms or cantilevers. The parts are connected with each other, forming a meander-like arrangement. Preferably, the legs 8 and 9 have further a substantially parallel configuration in relation to the length of the absorption plate 26.

Preferably, the four arms of each leg 8 and 9 include an inner bimaterial cantilever 10 and 11 on the legs 8 and 9 respectively (hatched region representing the metallic surface), an inner thermal isolation arm 16 and 17 on the legs 8 and 9 respectively, an outer thermal isolation arm 14 and 15 on the legs 8 and 9 respectively, and an outer bimaterial cantilever 12 and 13 on the leg 8 and 9 respectively (hatched region). Each of the inner and outer bimaterial cantilever arm (10, 11, 12, and 13) includes at least the two base layers, namely the structural SiO layer and the metallic layer, thus called "bimaterial" due to the mismatch of CTEs. In some implementations, the structural layer thickness is the same as the structural layer thickness on the absorption plate 26. Preferably, this layer is deposited and structured only once in the microfabrication process to enable fabrication simplicity. In some implementations, the metallic layer can be of the same material and thickness as the reflector material to furthermore enhance fabrication simplicity. In some implementations, a material combination for the inner and outer bimaterial cantilever arms can be SiO—Al, due to the large CTE mismatch of both materials.

The arms of each leg 8 and 9 are connected to each other with connection elements. The connection elements are in particular 22 and 23, connecting the inner bimaterial cantilevers 10 and 11 to the inner thermal isolation arms 16 and 17 respectively, further the connection elements 20 and 21, connect the inner thermal isolation arms to outer thermal isolation arms on leg 8 and 9 respectively, and last connection elements 18 and 19, connecting the outer bimaterial cantilevers 12 and 13 with the outer thermal isolation arms 14 and 15 respectively. The connection elements 18-23 are parts of the legs, connecting the arms with each other. In some implementations, the connecting elements 18-23 can be of identical length and width. In some implementations, the connecting elements 18-23 may only include the structural layer. The lengths of the connection elements impart a gap between the legs' parts and gap between the leg and the absorption plate. In some implementations, the gap between the leg's parts can be as small as the micro-fabrication tolerances allow.

The thermal isolation regions are responsible for a temperature gradient generation on the structural layer when infrared radiation is absorbed. SiO has a very low thermal conductivity making it a useful material for thermal isolation. A temperature gradient in the structure will result in a tilt of the absorption plate 26 due to the thermomechanical (bimaterial) actuation of the inner bimaterial cantilevers 10 and 11. In this case the outer bimaterial cantilevers 12 and 13 have the same temperature as the substrate and the temperature gradient declines over the thermal isolation regions. If heat is applied from the substrate then the entire micromechanical pixel's 1 temperature will increase accordingly, actuating both, the inner (10 and 11) and the outer (12 and 13) bimaterial cantilevers of each leg 8 and 9, respectively. Since both inner and outer bimaterial cantilever arrangements are substantially identical, the net deflection of the absorption plate 26 is nearly zero. This specific leg geometry provides for an independency of the absorber plate response upon environmental temperature changes.

Figure 4A:
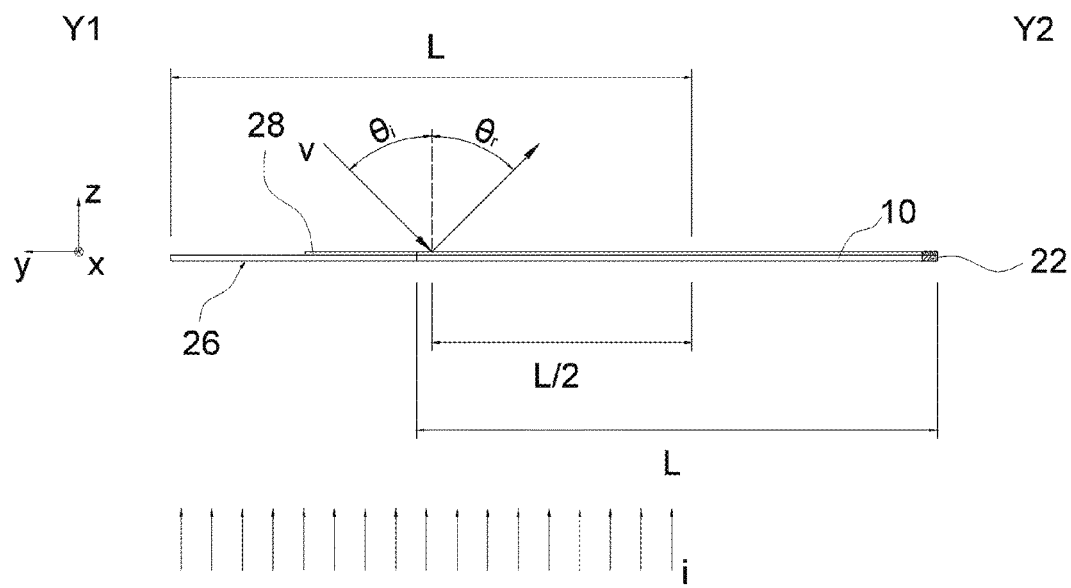
FIGS. 4a and 4b show a cross-sectional view of an example micromechanical pixel to aid in illustrating its operational principle.
Figure 4B:
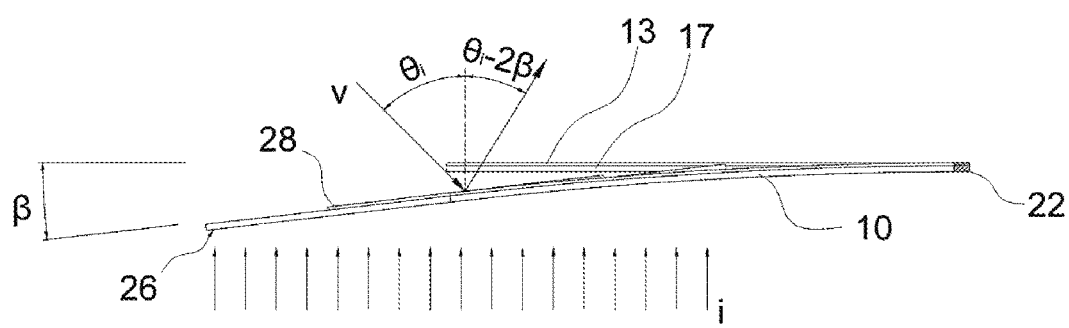

The operational principle of the micromechanical pixel 1 is further detailed in the schematic cross sectional view along the line Y1-Y2 of FIG. 3*a*, as displayed in an non-elongated state in FIG. 4*a* (thermal equilibrium) and an elongated state in FIG. 4*b*. In FIGS. 4*a* and 4*b* the substrate 7 is not displayed for simplicity purposes.

Schematically shown in both FIGS. 4*a* and 4*b* the (infrared) radiation, marked with the arrows "i", irradiate the pixel's bottom side and the readout optical (visible) light ray "v" illuminating the pixel from the topside with the angle of incidence $\theta_i$, reflection of the reflector 28, which is partially visible with an angle of reflection $\theta_r$. The herein defined normal is perpendicular to the reflector 28 plane in a non-elongated state, disregarding of the magnitude of the elongation. The optical light ray v can be emitted by a light source, such as, but not limited to a LED and, in some implementations, its position can remain unchanged during operation. In such implementations, the angle of incidence may remain fixed with respect to the herein defined normal. The angle of reflection $\theta_r$, however, changes with the absorber plate's 26 tilt $\beta$ (optical lever method). The reflected light ray can be captured by an electromagnetic light sensor or a photo/position sensitive device, such as, but not limited to a CCD. The reflected ray displacement upon the angle of reflection $\theta_r$ change is captured by the light sensor and signal processed into a pixel bit value representing the incident radiation intensity. In some implementations, the readout light ray v may include shorter wavelengths than the visible light due to diffraction-limitation compensations of small reflector sizes. UV readout light may be used. In some implementations the reflector plane 26 does not need to be in plane with the substrate plane (not shown but parallel to the x-y-plane) due to intrinsic thin-film stress deformations. The absorber plane 26 can be positioned in a non-elongated state with an initial angle to the x-y-plane (substrate-plane) due to an intrinsic stress deformation of the legs or arms. The operational principle remains the same.

In FIG. 4*b* the micromechanical pixel 1 schematic example is now illustrated in a deflected state after infrared radiation absorption, which generates in illustrated state a sufficient temperature gradient for the inner bimaterial actuators (from this view only 10 visible) to deflect. The absorbing plate 26 tilts with an angle $\beta$ out of its thermal equilibrium plane. Thus the angle of reflection changes by the angular amount of $2\beta$, which can be described with $\theta_r=\theta_i-2\beta$ in this case. The inner bimaterial part 10 is illustrated in its deflected state. The aluminum with its higher CTE is the top layer and the SiO with its low CTE is the bottom layer. From this perspective the right inner thermal isolation leg 17 and the right outer bimaterial leg 13 are also partially visible, behind the absorber plate from given perspective.

Figure 5A:
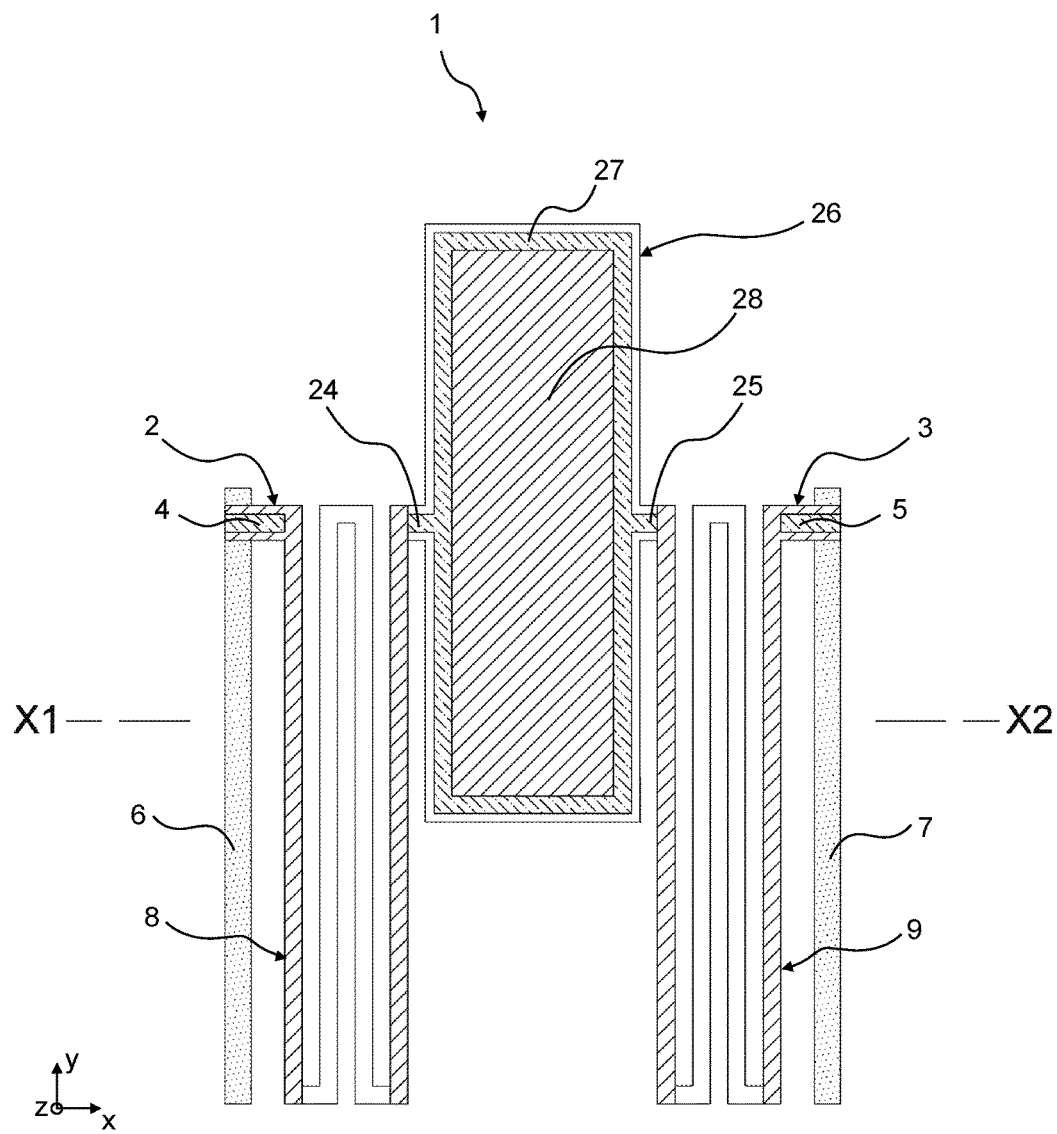
FIGS. 5a and 5b show another example micromechanical pixel in a top and cross-section view respectively.
Figure 5B:
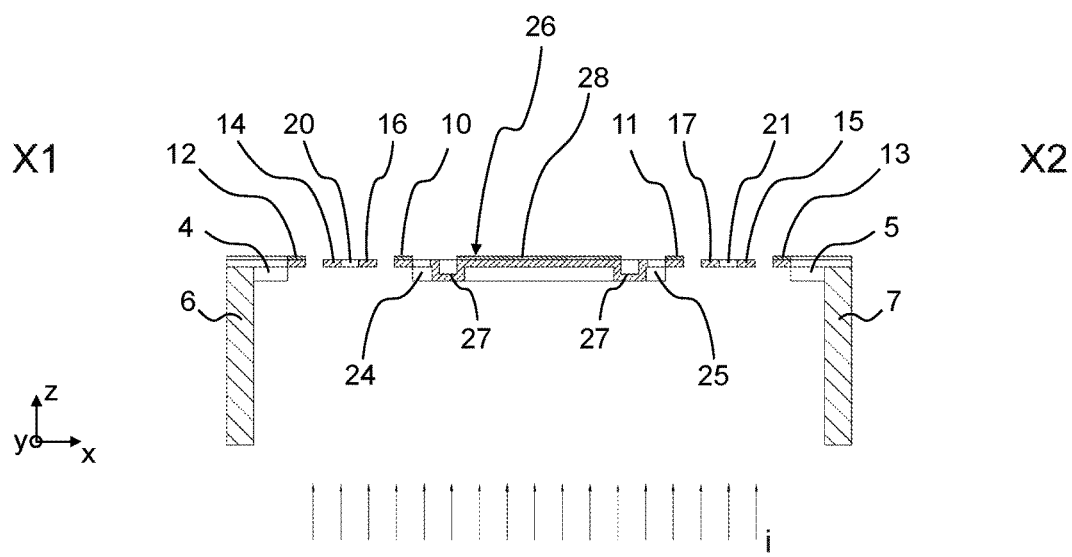

Referring now to FIGS. 5*a* and 5*b* an alternative layout of the micromechanical pixel 1 is shown, including an in-depth (or ribbed) profile 27 ("trench") as part of the absorption plate 26 rigidness enhancements. Such method of applying a structural in-depth feature to surface can further aid to compensate thin-film stress related deformations through increasing the area moment of inertia (second moment of area) of the absorber plate 26. The geometry of the profile is not limited to the one presented in this embodiment. Due to an increase in the absorption plate's 26 rigidity provided by the in-depth profile 27, thinner thin-films may be utilized to micro-fabricate the improved micromechanical pixel 1. Thinner thin-film layers can result in a higher bending response, resulting in an overall sensitivity and responsivity improvement, further they can lead to a lower thermal mass, which in turn improves the micromechanical pixel's 1 dynamical performance. The in-depth profile 27 can also reduce or mitigate unwanted thermomechanical deformation of the absorption plate 26. The absorber/reflector plate 26 forms inevitably a bimaterial actuator formed by two layers with different CTEs and therefore it can thermo-mechanically actuate upon temperature changes. As shown in this example embodiment the reflector 28 has a larger extent than the example of FIG. 1. In FIG. 5*b* the in-depth profile 27 is shown in its cross-section along the lines X1-X2 from FIG. 5*b*.

Further the implementation of an in-depth profile for rigidity enhancement is not limited to the absorber plate area alone. As shown in FIG. 5*a* the anchor elements 2 and 3 can include an in-depth profile 4 and 5 respectively as well. Also any of the connection elements or the thermal isolation regions may include an in-depth profile as well. The only areas, which are designed for actuating, are the pairs of inner and outer bimaterial cantilevers (inner 10 and 11, and outer bimaterial cantilevers 12 and 13, on legs 8 and 9 respectively).

In one embodiment, the micromechanical pixel 1 includes an optional in-depth profile for structural rigidness enhancement.

Figure 6A:
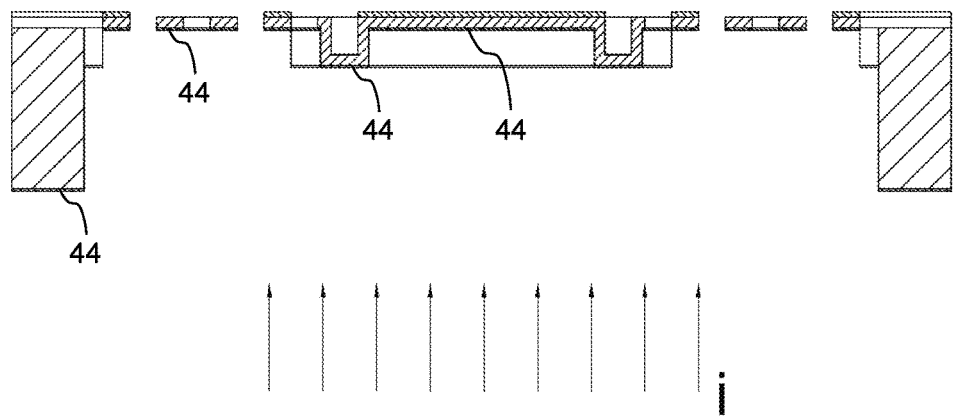
FIGS. 6a to 6c show a cross-sectional view of additional example micromechanical pixels.
Figure 6B:
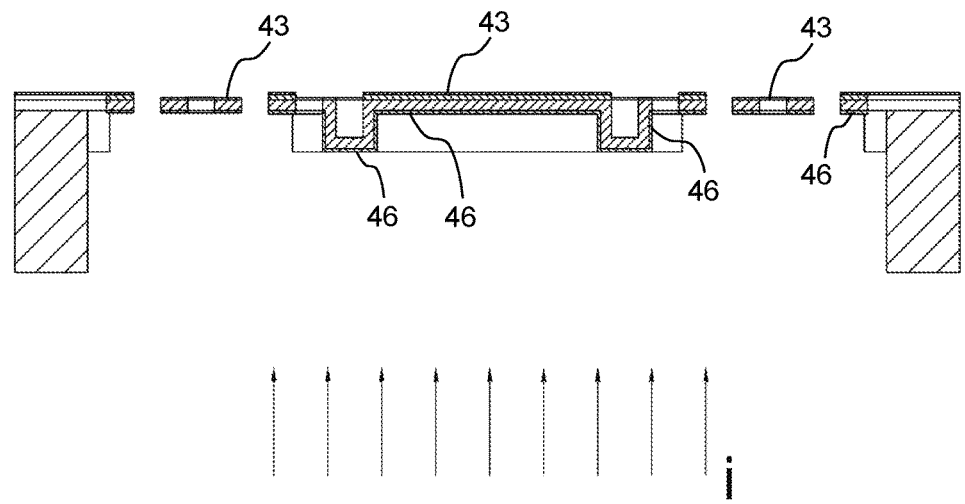
Figure 6C:
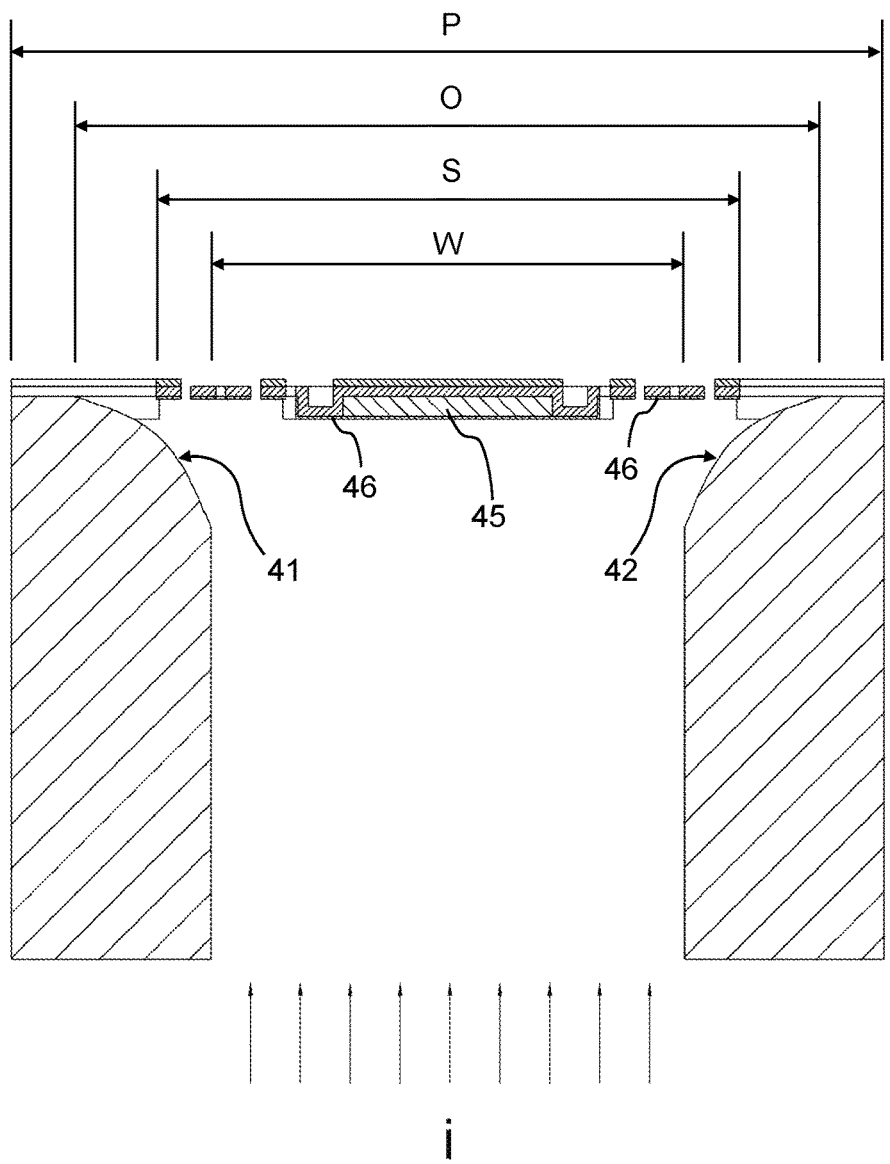

Referring now to FIGS. 6*a* to 6*c* further variations of the micromechanical pixel 1 are displayed in a schematic cross-section view. In general, the micromechanical pixel's 1 legs 8 and 9 and the absorbing plate 26 are not in contact with the substrate and are free standing in order to function accordingly. Part of the microfabrication process to create a micromechanical pixel 1 or a pixel array having multiplicity of micromechanical pixels 1, includes deposition and the patterning of at least the structural and the metallic layer and pattern the substrate via back side etch to release the pixels. The micromechanical pixel array can be advantageously produced in minimum three microfabrication patterning steps without utilizing sacrificial layers. In some implementations, the SiO structural layer can possess sufficient etch selectivity against the substrate backside-etch agent and form a natural etch barrier.

Referring now to FIG. 6*a*, an additional layer can be deposited from either the top or the bottom side of the micromechanical pixel 1 post-release. Such thin-film deposition is plain and without structuring. A bottom side deposited thin-film 44 can be used for absorption and/or thermal conductivity enhancements. Hence performance enhancements can be performed without utilizing an additional patterning step.

In one embodiment, the micromechanical pixel 1 includes an optional absorption layer in addition to the structural layer for improvement in absorption performance.

A thermal conduction enhancement layer can be deposited also on the front side of the micromechanical pixel 1 as indicated in FIG. 6*b* with film 43. Depositing the entire front and/or back surface of the micromechanical pixel 1 with a thin conduction layer will result in the coverage of the thermal isolation regions of the legs, e.g., the arms that have only the structural layer. This is intended and will increase the thermal conduction via each leg $G_{leg}$, hence an increase of the total thermal conductance G will result. The purpose of depositing a conduction layer onto the micromechanical pixel 1 is to increase the overall pixel's thermal conductivity and for the thermal conduction via each leg to become the dominating heat dissipating mechanism of the micromechanical pixel 1. As a result of a thermal conductance increase through thermal conduction via each leg, the output deflection will decrease, however the dynamic response will advantageously increase, allowing a higher imaging frame rate per second. Further the sensor characteristics will become less dependent on the micromechanical pixel's 1 operational temperature $T_{sensor}$, because the heat loss through back-radiation $G_{rad}$ ($G_{rad} \propto T_{sensor}^3$) dependency will become relatively smaller with a dominating heat loss through thermal conduction $G_{leg}$ via the legs. This aspect is particularly relevant for relatively large micromechanical pixels 1 of a size P>100 µm, which posses a relatively large surface area that re-emits with a ($G_{rad} \propto T_{sensor}^3$) dependency after Stefan-Boltzmann law. With a dominating $G_{leg}$ the ($G_{rad} \propto T_{sensor}^3$) dependency will have a much smaller impact on the operational temperature $T_{sensor}$ variation of the sensor characteristics. For example, a 40 nm thin Al layer deposition on the micromechanical pixel's 1 front surface (P=200 µm) after the pixel's release, will result in an overall 2.6 times higher total thermal conductance G, with thermal conduction via each leg $G_{leg}$ as the dominating heat dissipation mechanism. This value results in a 3.12 times higher thermal response and a deviation of less than ±10% of the micromechanical pixel's 1 characteristics (such as normalized responsivity and thermal response time) in dependency of operational temperature variations of (20±30)° C.—as opposed to a micromechanical pixel without any conduction layer. With the additional conduction layer, the total thermal conductance G can be calculated with $$G = 2 \times G_{leg} + G_{rad} = 2 \times \left( \frac{l_i}{g_1 t_i w_i + g_3 t_c w_c} + \frac{l_b}{g_2 t_b w_b + g_1 t_i w_i + g_3 t_c w_c} \right)^{-1} + 4(\varepsilon_1 + \varepsilon_3) A \sigma T_{sensor}^3$$

where $l_b$, $t_b$, $w_b$ is the length, thickness and width of the bimaterial part respectively, $l_i$, $t_i$, is the length, thickness and width of the thermal isolation part respectively, $g_1$, and $\varepsilon_1$ are the thermal conductivity and the emissivity of material 1 (dielectric) respectively, $g_2$, the thermal conductivity of material 2 (metal), A the sensor's effective area having the absorption area and parts of the legs, σ the Stefan-Boltzmann constant (σ=5.67×10$^{-8}$ Wm$^{-2}$K$^{-4}$) and $T_{sensor}$ the sensor's temperature, and where $t_c$ is the thickness, $w_c$ the width, $g_3$ the thermal conductivity, and $\varepsilon_3$ the emissivity of the deposited conduction layer. Advantageously, the thermal conductivity can be adjusted conveniently without utilizing a patterning process step, by only depositing a conduction layer on the pixel.

In one embodiment, the micromechanical pixel 1 includes an optional conduction layer for performance adjustment.

In some implementations, the SiO structural layer cannot form a sufficient etch barrier for the final back side substrate etch process. The selectivity of the structural layer material to the exposed substrate etch agent may not be satisfying. Also a lack of backside etch uniformity can lead to longer exposures of the structural layer material to the etch agent in some areas of the total substrate area. The exposure of the structural layer material in the etch agent may lead to modifications of the structural layer material geometry and properties. Hence, in some implementations, another layer can be deployed prior to the structural layer deposition that has a higher etch resistivity against the target substrate removal etch agent. Such layer can be referred to as an etch stop layer or etch barrier layer and is shown in FIG. 6b as film 46 forming the bottom surface of the patterned structural layer.

In one embodiment, the micromechanical pixel 1 includes an optional etch-barrier layer for a potentially higher manufacturing yield.

Referring now to FIG. 6c, a micromechanical pixel 1 is shown again in its cross section with an additional structured absorption layer 45 in between the structural layer and the etch stop layer 46. The absorption layer for absorption enhancement can be structured and be deposited before or after the deposition of the structural layer.

The micromechanical pixel 1 shown in FIG. 6c, compared to FIG. 6a or 6b, has a different substrate thickness as well as the back side release pattern opening width W. Although the substrate's dimensions are not proportional and not to scale in FIG. 6c, its purpose is to schematically explain the positive effect of notching 41 and 42. Critical for the micromechanical pixel 1 to be free standing is that its legs and absorption area are not in contact with the substrate. The structural width of the legs and absorber plate is marked with the width S. If W<S and no notching occurs then part of the legs would not be freestanding. If notching occurs and its topside opening has the width O and if O>S then the structure is freestanding and can function accordingly. Such method can be implemented for smaller sizes of the micromechanical pixel 1 (e.g. P<100 µm) due to a structural thickness requirement of the substrate rails.

Figure 7A:
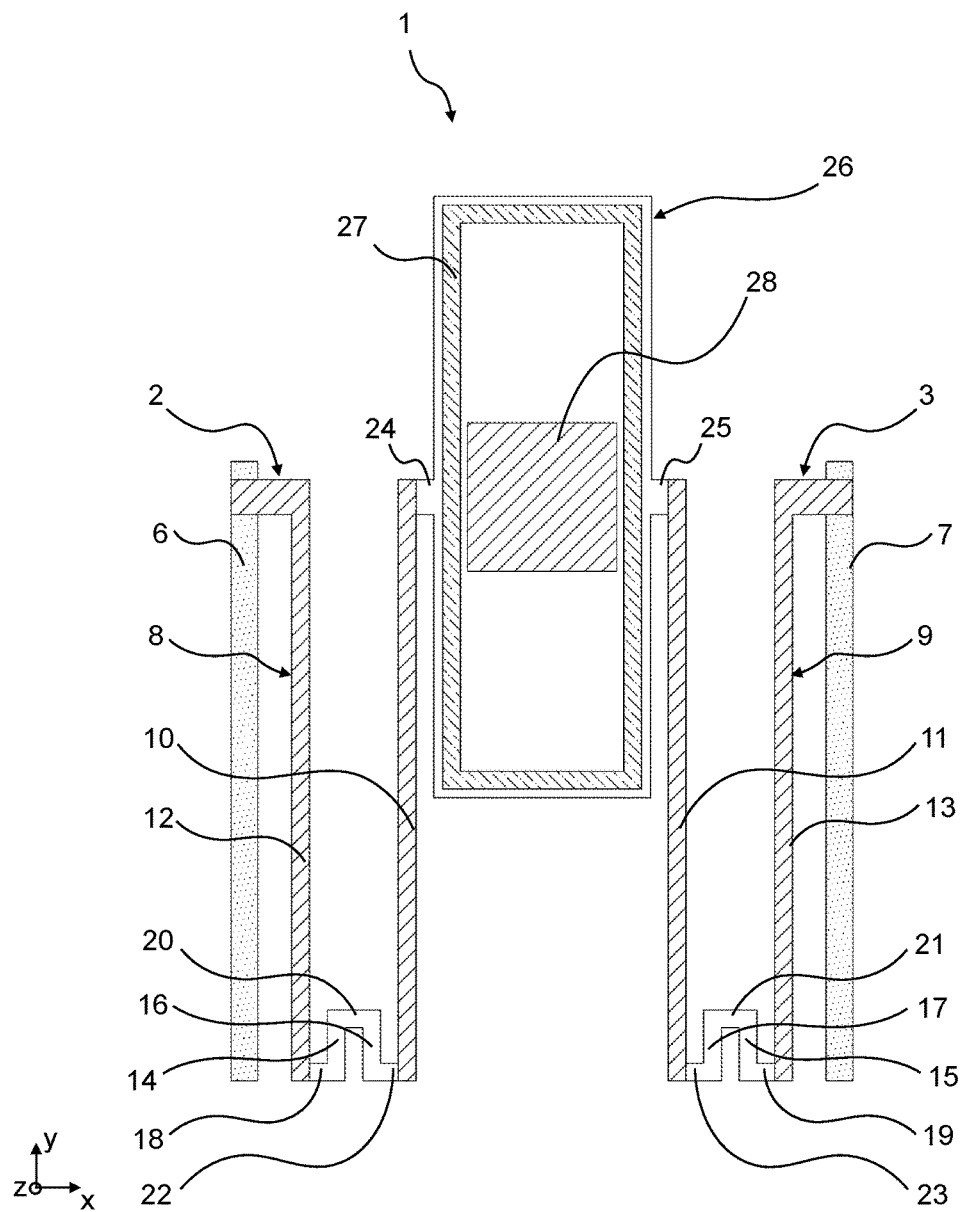
FIGS. 7a and 7b show yet another example micromechanical of pixels in a top view.
Figure 7B:
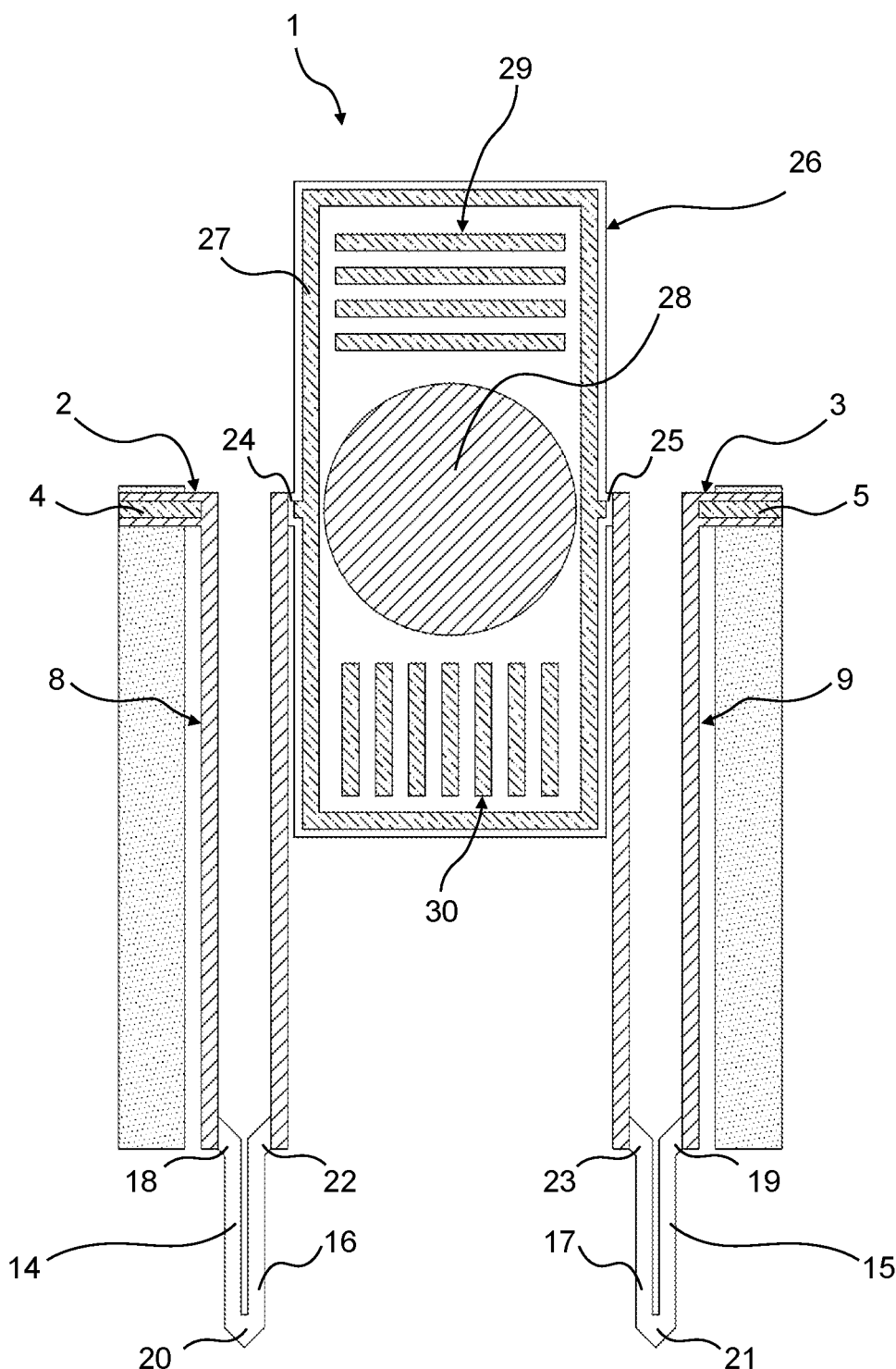

Referring now to FIGS. 7a and 7b further alternative layouts of the micromechanical pixel 1 are shown. The main feature of these alternative embodiments is that the length of the thermal isolation legs can be shorter than the overall bimaterial leg length. Reducing the overall thermal isolation leg length can result in a smaller responsivity, but therefore in a larger dynamic response. In some implementations dynamic response may be prioritized over the responsivity of the micromechanical pixel.

In one embodiment, the micromechanical pixel 1 may include geometrically adjusted thermal isolation regions for performance adjustments.

Referring still to FIGS. 7a and 7b, some variations of some pixel features are schematically displayed. For example in FIG. 7a the reflector 28 has a square shape. For example in FIG. 7b the proportions of the entire micromechanical pixel 1 in terms of lengths and widths of the individual elements vary from the proportions displayed e.g. in FIG. 7a. In addition FIG. 7b displays thermal isolation legs (14-17) pointing away from the absorber plate's 26 position. Also the arrangement of the connection elements (here shown 18-23) to the arms does not need to be perpendicular to the leg's parts and further the connection elements can be rounded or be non-abrupt. Further the absorber plate 26 includes an additional in depth profile in its surface, which enable rigidity enhancement for the width and length in the form of ribs 29 and 30 respectively.

In one embodiment, a micromechanical radiation sensor includes an absorber/reflector plate which has: a structural layer of a radiation optical absorbing material, and an optical reflecting layer of a light reflecting material deposited over the structural layer. The sensor further includes at least two supporting legs attached to the absorber/reflector plate, where each of the at least two supporting legs has: two substantially parallel bimaterial arms of substantially identical length including the structural layer in contact with the light reflecting layer, and in between the two parallel bimaterial arms at least one thermal isolation region, including the structural layer The sensor further includes at least two anchors, each of the at least two anchors attached substantially perpendicular to each supporting leg, and connecting the absorber/reflector plate to a patterned substrate.

In one embodiment, the structural layer has a coefficient of thermal expansion that is smaller than the coefficient of thermal expansion of the optical reflecting layer. In one embodiment, the structural layer has a thermal conductivity that is smaller than the thermal conductivity of the optical reflecting layer.

In one embodiment, the absorber/reflector plate includes ribs along at least one of its sides.

In one embodiment, each of the at least two anchors include ribs along its length.

In one embodiment, each of the at least two anchors include the structural layer and the reflective layer.

In one embodiment, each supporting leg includes two bimaterial arms and two thermal isolation arms disposed between and substantially parallel to the two bimaterial arms, and where one end of one of the two bimaterial arms is attached to the anchor and one end of the other of the two bimaterial arms is attached to the absorber/reflector plate.

In one embodiment, the sensor further includes an adhesion layer disposed between the structural layer and the light reflecting layer.

In one embodiment, the structural layer has a thickness of about 50 nm to about 5000 nm. In one embodiment, the optical reflecting layer has a thickness of about 40 to about 120% of the structural layer.

In one embodiment, the structural layer is silicon oxide or silicon dioxide and the optical reflecting layer is aluminum.

In one embodiment, the absorber/reflector plate and the at least two supporting legs are free standing, hence not in contact with the substrate; and the supporting legs are connected to the substrate via the two anchors (anchor elements).

In one embodiment, the absorber/reflector plate and the at least two supporting legs are released by substrate etch without the usage of sacrificial layers.

In one embodiment, the substrate release pattern forms a column opening arrangement in order to allow a dense arrangement of micromechanical sensors in column direction, where the micromechanical sensors are connected to the patterned substrate via two substantially perpendicular anchors.

In one embodiment, the structure of the substrate is formed via patterning of the substrate to form the shape and geometry of the in-depth pattern, the deposition of and the patterning of the structural layer, the deposition of and the patterning of the optical reflecting layer and ultimately the patterning of the substrate to release the micromechanical pixel.

In one embodiment, an etch barrier layer is deposited prior the structural layer deposition.

In one embodiment, the structure of the substrate is formed via the patterning of the substrate to form the shape and geometry of the in-depth pattern, the deposition of the structural and subsequently the optical reflecting layer, the patterning of both layers and ultimately the patterning of the substrate to release the micromechanical pixel; and an etch barrier layer is deposited prior the structural layer deposition.

In one embodiment, the sensor includes a conducting layer, which has a higher thermal conductivity than the structural layer, wherein the conducting layer is deposited the front surface or the back surface or on both surfaces.

In one embodiment, the sensor includes a conducting layer, which has a higher thermal conductivity than the structural layer, wherein the conducting layer is deposited and subsequently patterned on the front surface.

In one embodiment, the sensor includes a further light absorbing layer beneath or on top of the absorber/reflector plate.

In one embodiment, the sensor includes an etch barrier layer disposed first and beneath the structural layer.

In one embodiment, a micromechanical radiation sensor has an absorber/reflector plate including: a structural layer of an optical absorbing material (e.g., silicon oxide or silicon dioxide), and an optical reflecting layer of a light reflecting material (e.g., aluminum), deposited over the structural layer. The sensor further includes two legs attached to the absorber/reflector plate, each including two substantially parallel bimaterial arms of substantially identical length including the structural layer in contact with the light reflecting layer, and in between the two parallel bimaterial arms at least one thermal isolation region, including the structural layer. The sensor further includes two anchors, each attached substantially perpendicular to each supporting leg, and connecting the absorber/reflector plate and the two legs to a patterned substrate.

In one embodiment, the structural layer has a coefficient of thermal expansion that is smaller than the coefficient of thermal expansion of the optical reflecting layer. In one embodiment, the structural layer has a thermal conductivity than that is smaller than the thermal conductivity of the optical reflecting layer.

In one embodiment, the absorber/reflector plate includes ribs along at least one of its sides.

In one embodiment, each of the at least two anchors include ribs along its length, the structural layer and the reflective layer.

In one embodiment, each of the two legs includes two bimaterial arms with at least one thermal isolation arm disposed between and all arms being substantially parallel to each other, and wherein one end of the bimaterial arms is attached to the anchor and one end of the other bimaterial arm is attached to the absorber/reflector plate.

In one embodiment, an adhesion layer disposed between the structural layer and the light reflecting layer.

In one embodiment, the structural layer has a thickness of about 50 nm to about 5000 nm; and the optical reflecting layer has a thickness of about 40 to about 120% of the structural layer.

In one embodiment, the absorber/reflector plate and the at least two supporting legs are free standing, hence not in contact with the substrate.

In one embodiment, the absorber/reflector plate and the at least two supporting legs are released by substrate etch without the usage of sacrificial layers.

In one embodiment, the substrate release pattern is forming a column opening arrangement to allow a dense arrangement of micromechanical sensors in column direction, and where the micromechanical sensors are connected to the patterned substrate via two substantially perpendicular anchors.

In one embodiment, the structure of the substrate is formed via the patterning of the substrate to generate the shape and geometry of the in-depth pattern, the deposition of and the patterning of the structural layer, the deposition of and the patterning of the optical reflecting layer and ultimately the patterning of the substrate to release the micromechanical pixel.

In one embodiment, the structure of the substrate is formed via the patterning of the substrate to form the shape and geometry of the in-depth pattern, the deposition of the structural and subsequently the optical reflecting layer, the patterning of both layers and ultimately the patterning of the substrate to release the micromechanical pixel.

In one embodiment, the micromechanical radiation further includes an optional conducting layer deposited on the front surface or the back surface or on both surfaces.

In one embodiment, the micromechanical radiation further includes an optional conducting layer deposited and subsequently patterned on the front surface.

In one embodiment, the micromechanical radiation further includes an optional a conducting layer having a higher thermal conductivity than the structural layer.

In one embodiment, the absorber/reflector plate further includes a light absorbing layer deposited and structured over and/or beneath the structural layer.

In one embodiment, the absorber/reflector plate is connected to the legs at about the middle of each side that is substantially parallel to the legs, with a connection line between the two connecting points running through about the plate's center of gravity.

Device with Higher Stiffness and Larger Absorber/Reflector Plate

For some embodiments, as described below in this section titled "Device with Higher Stiffness and Larger Absorber/Reflector Plate", the disclosure provides systems, methods, and apparatus for providing an improved electromagnetic radiation sensing micromechanical device to be utilized in high pixel-density pixel sensor arrays. The embodiments described below are in general similar to the devices earlier described above, but include specific variations as may be described for each embodiment below.

The device includes an improved design for improved and adjustable performance through geometric or fabrication means. Furthermore, the design of the device lends itself to simplified micromechanical manufacturing procedures. Additionally, the manufacturing procedures include a method to enable high uniformity and high yield sensor arrays. Arrays of the device can be utilized as IR imaging detectors for use in applications such as human presence detection, nonvisual environment monitoring, security and safety, surveillance, energy monitoring, fire detection and people counting.

Nonvisual environment monitoring and monitoring of human presence are crucial applications for security & safety, energy savings, fire detection, human counting and behavior analysis. One technology used for these kinds of applications is infrared technology, in particular uncooled thermal imaging. Every object in our environment has a unique thermal footprint and therefore thermal imaging offers detection of human presents in an enclosed environment with a very high accuracy and negligible false alarm rate. Human body temperature and emissivity in the long wave infrared band is in most cases distinguishably higher than the thermal footprint of typical indoor and outdoor environmental surroundings. Thermal imaging with a limited spatial resolution is sufficient to accurately detect humans without revealing the individual's identity. This aspect of environmental and human monitoring is of general interest with regards to privacy protection. Some thermal imaging technologies are either too expensive or have insufficient spatial resolution. Some thermal imaging devices can be based on thermopile or pyroelectric array sensors. These devices, however, possess limited spatial resolution of, for example, 8×8=64 pixels. Microbolometer technology based thermal cameras offer good imaging performance, at higher cost. A need exists for ubiquitous limited spatial resolution infrared imagers at a lower (e.g., commodity) price.

One example of a potentially inexpensive thermal imager with a limited spatial resolution is based on an uncooled thermo-mechanical bimaterial microelement, which converts incident infrared radiation into a micromechanical displacement. The micromechanical response is captured optically by an optical imaging system and converted into a readable electrical signal for further image processing and thermal image generation. Most of currently known micromechanical sensor imagers include a complex manufacturing process, or have insufficient performance or both.

The working principle of a radiation sensing micromechanical element is based on a cantilever compound of at least two different materials with a mismatch of coefficients of thermal expansion (CTE). Upon radiation absorption, the device experiences a local temperature increase, resulting in a thermo-mechanical, reversible motion of the non-fixed bimaterial cantilever end. The device's design is typically set up in a manner such that thermo-mechanical motion results in an angular actuation of a reflecting area. The actuation can be read out though an optical system. Some optical systems, for example as used in scanning probe microscopes have the ability to detect motions on the nanometer level.

Figure 8:
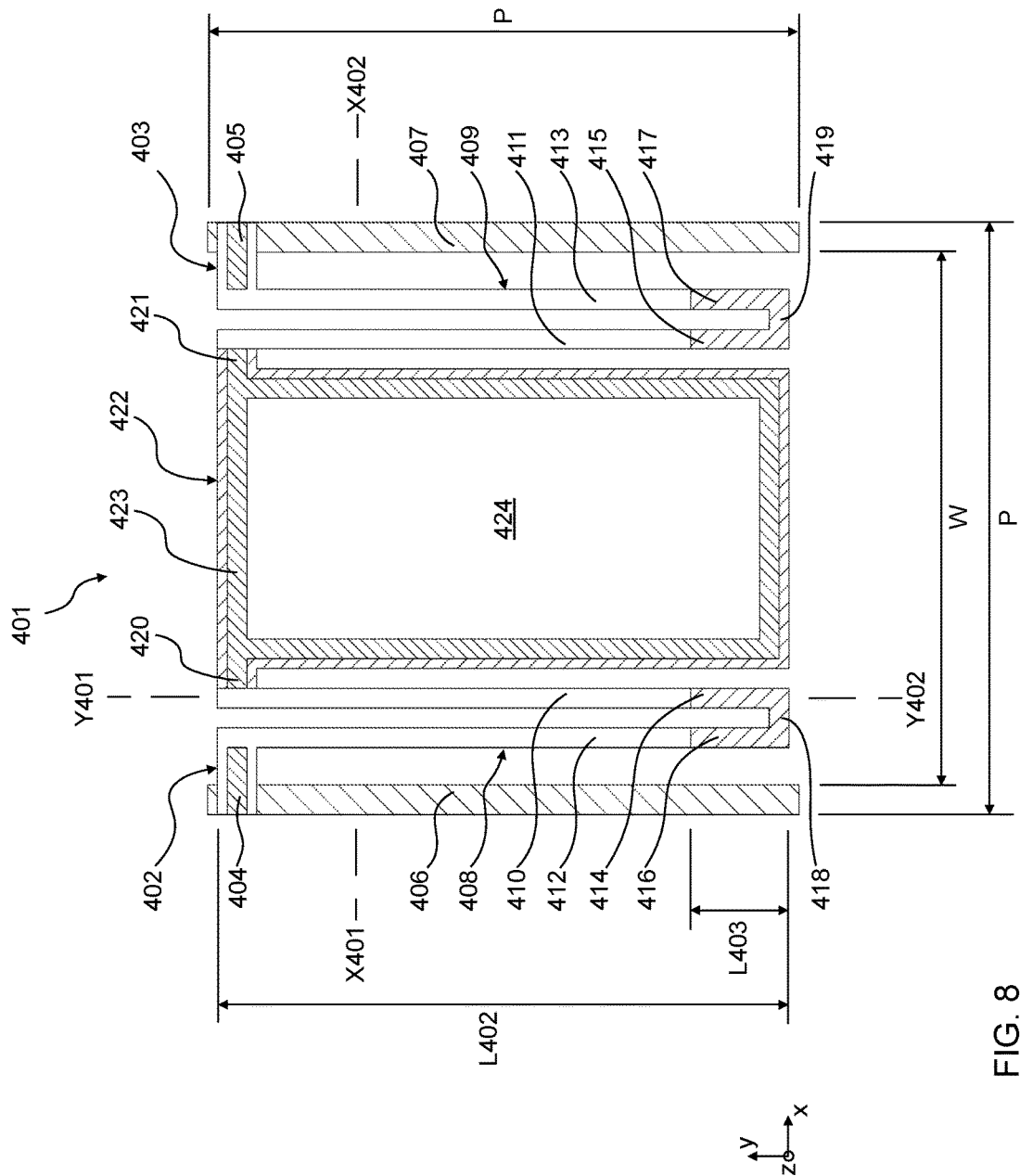
FIG. 8 shows another example micromechanical pixel.

FIG. 8 shows an example micromechanical pixel 401. Micromechanical pixel 401 is similar to the micromechanical pixel 1 including a variation in the design of the legs. Specifically, each leg comprises only two arms instead of four arms to increase the micromechanical pixel's 401 stiffness. The micromechanical pixel 401 includes a substantially rectangular absorption plate 422, a pair of substantially identical, symmetrical and meander-shaped legs 408 and 409, and two anchor elements 402 and 403, which connect the absorption plate 422 via the legs 408 and 409 to the substrate 406 and 407 respectively. The micromechanical pixel 401 is formed in a manner such that the absorption plate 422 has a symmetrical arrangement in the direction of the y-axis, is coupled to a leg and an anchor element on each of its two sides in the x-axis direction (left and right of the absorption plate 422). The y-axis is defined as the section above as perpendicular to the pixel's axis of rotation. The x-axis is parallel to the pixel's axis of rotation and perpendicular to the y-axis. The x-y-plane is substantially parallel to the substrate surface which suspends the micromechanical pixel 401. The micromechanical pixel 401 can have a substantially square shape, with each side having length P micrometers. P indicates the pixel pitch which can be equivalent for the length and the width of the micromechanical pixel 401. In some implementations, the micromechanical pixel 401 can have a substantially rectangular shape in the x-y plane.

A plurality of the micromechanical pixel 401 can be arranged in a two-dimensional plane array configuration of pixels with substantially equal inter-pixel distances. Furthermore the micromechanical pixel 401 can be manufactured without utilizing sacrificial layers, and can be released via substrate removal. The micromechanical pixel 401 is free standing, i.e., without the substrate coming in contact with the absorption plate 422 and the legs 408 and 409. The micromechanical pixel 401 is supported over the substrate by the anchor elements 402 and 403.

In some implementations, the micromechanical pixel 401 consists of a structural layer and a metallic thin-film layer. Optionally the micromechanical pixel 401 can in addition to the two basic layers consist of other layers, such as one or plural conduction layers and/or one or plural absorption layers and/or one or plural etch barrier layers. The structural layer can include siliconoxide (SiO). Siliconoxide can refer to the chemical compound of any stoichiometry, i.e. $SiO_2$, $SiO_x$ or SiO, and can be deposited or grown via any thin-film deposition or growth method. SiO is a good IR absorber. Typical thin film layer thicknesses of the structural layer can be about 50 nm to about 5,000 nm. The structural layer is deposited or grown and subsequently patterned with only one step each to enable micro-fabrication simplicity. The structural layer defines the micromechanical pixel's geometry, i.e. the shape of the anchor elements, the legs and the absorber plate is defined with one micro-fabricational patterning step into the structural layer. In some implementations, a portion of the absorption plate's front facing surface is coated with a metallic thin-film layer, which forms the micromechanical pixel's reflector 424. Hence, the absorber plate 422 can be referred to as absorber/reflector plate or area. The reflector 424 can be formed using a variety of reflective metals such as, but not limited to aluminum (Al) and gold (Au). In some implementations, an adhesion layer may also be used to adhere the metallic thin film layer to the structural layer. The shape of the reflector 424 can be rectangular, as shown in FIG. 8, or can be any other shape such as square, elliptical, circular, etc. Other portions of the structural layer that are covered with a metallic thin-film layer include regions of the legs to form a bimaterial cantilever actuator and further include the anchor elements to enable fast thermal conduction to the substrate via the metallic layer.

In some implementations, thin films, such as the structural layer or the metallic layer have intrinsic stress and tend to deform freestanding geometries. In some implementations the absorber/reflector plate 422 can include an in-depth (or ribbed) profile 423 ("trench") as part of the absorption plate's rigidness enhancements. Such method of applying a structural in-depth feature to the surface can further aid to compensate thin-film stress related deformations through increasing the area moment of inertia (second moment of area) of the absorber plate 422. The geometry of the profile is not limited to the one presented in this embodiment. Due to an increase in the absorption plate's 422 rigidity provided by the in-depth profile 423, thinner thin-films may be utilized to micro-fabricate the improved micromechanical pixel 401. Thinner thin-film layers can lead to a lower thermal mass, which in turn improves the micromechanical pixel's dynamical and responsive performance. In addition thinner films will result in a higher bending response, resulting in an overall improvement in sensitivity and responsiveness. The in-depth profile 423 can also reduce or mitigate unwanted thermo-mechanical deformation of the absorption plate 422, because the absorber/reflector plate 422 forms inevitably a bimaterial compound formed by two layers with different CTEs and therefore it can thermo-mechanically actuate upon temperature changes, which is unwanted for the functionality of the micromechanical pixel 401. Solely the bimaterial actuating legs are meant to undergo a thermo-mechanical actuation, hence change the angular position of a stiff absorber/reflector plate 422.

Figure 17:
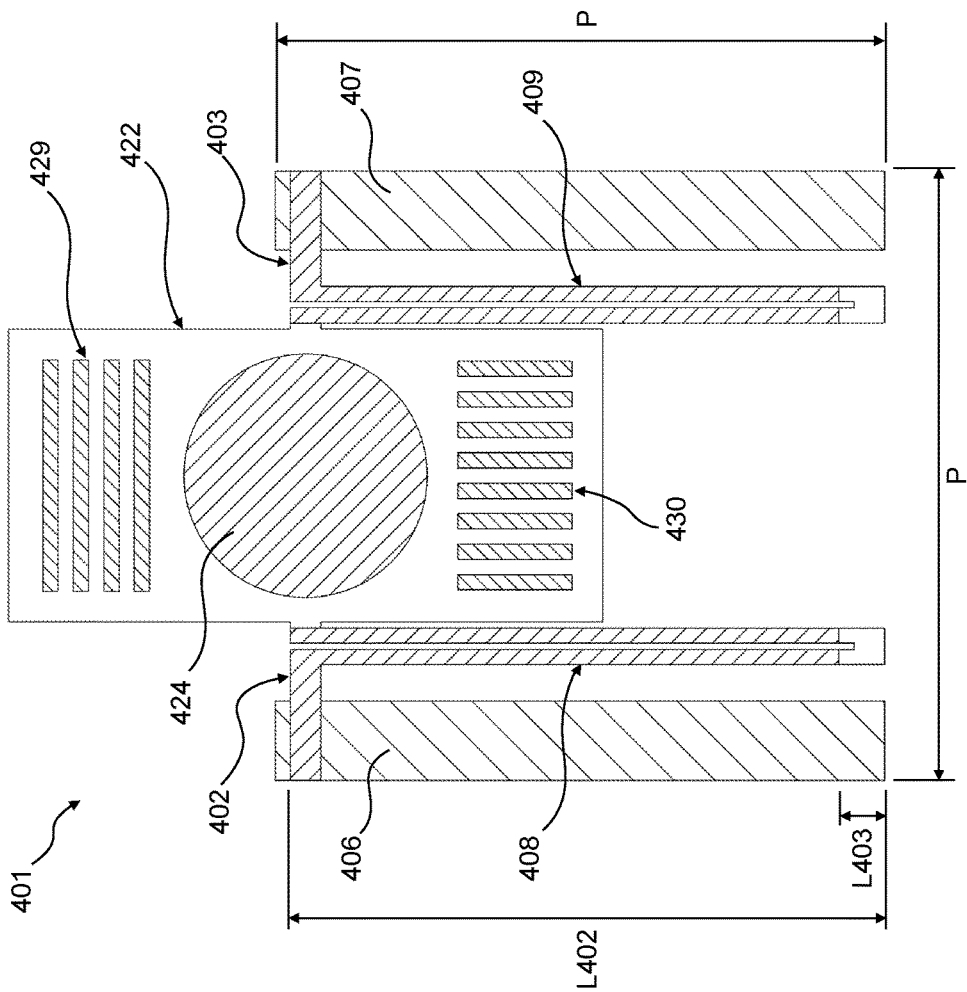
FIG. 17 shows a top view of yet another example micromechanical pixel.
Figure 18:
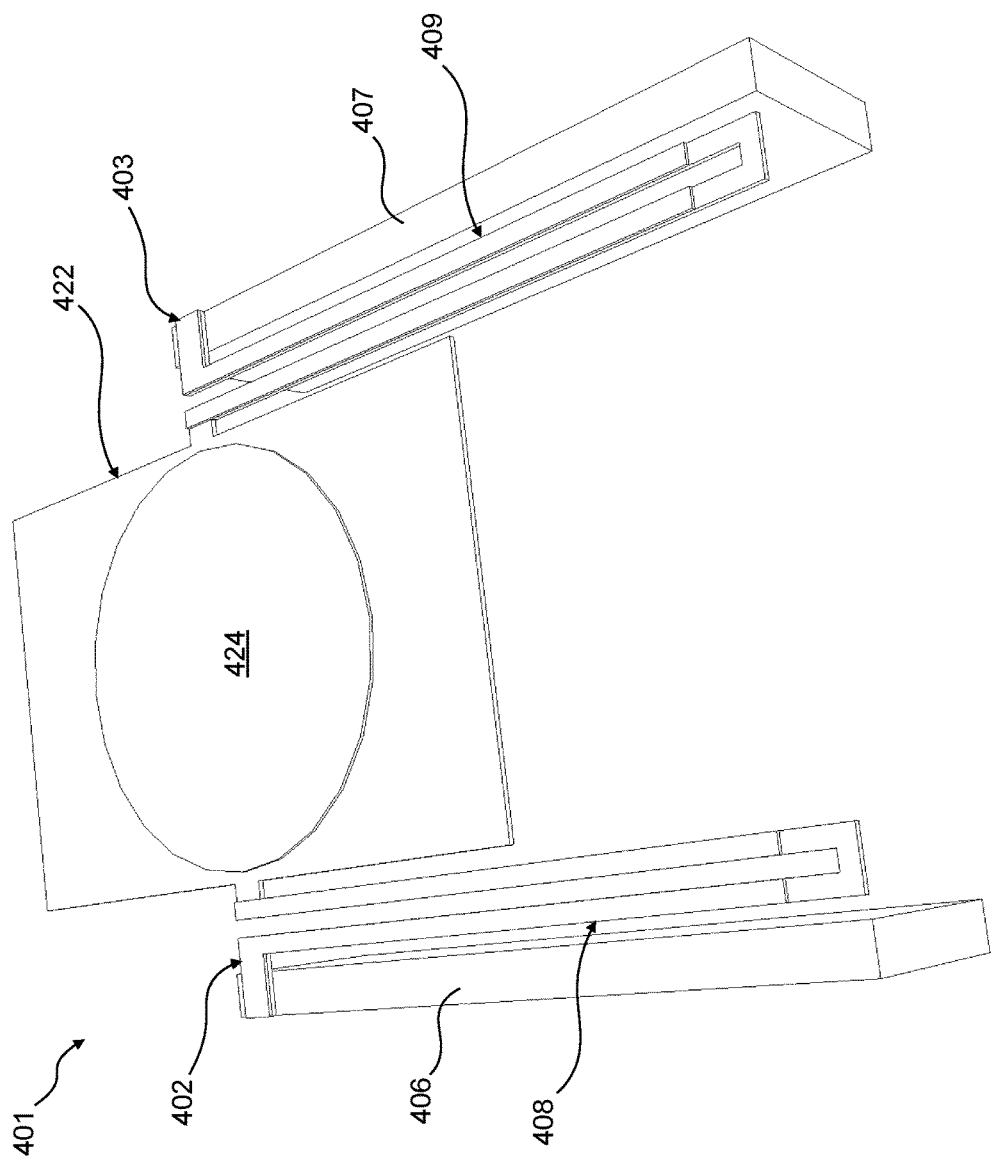
FIG. 18 shows yet another example micromechanical pixel in a perspective view.

In some implementations, the length of the absorbing plate 422 is L402, and slightly smaller than the micromechanical pixel's 401 overall length P. An example: for a 200 µm pixel pitch geometry P=200 µm and L402 can equal 195 µm or for example L402=199 µm, dependent on the micro-fabrication tolerances. The difference (P−L402) defines the gap between adjacent micromechanical pixels 401, in y-direction, when arranged in an array and P is the pitch of one pixel to its adjacent pixels. In some implementations the absorption plate 422 is connected at its outer top region via connection elements 420 and 421, which extend sideways to connect to the legs 408 and 409 respectively. In some implementations, such as shown in FIGS. 17 and 18, the absorber plate can be attached with the connection elements in about the center of each side that is substantially parallel to the legs to reduce thin-film related deformations as described above. The dimensions of these connection elements 420 and 421 dependent on the micro-fabrication tolerances, and can be, for example, about 1 to about 5 µm in length and about 5 to about 15 µm in width and can be strengthened with an in-depth profile 423.

The legs 408 and 409 are arranged on either longer side of the absorption plate 422 (i.e. left and right). In some implementations, such as the one shown in FIG. 8, each leg 408 and 409 can include two parallel parts. Often these parts are referred to as arms or cantilevers. The parts are connected with each other at the bottom end, forming a meander-like arrangement, which can be possibly described as a U-shape form. The legs 408 and 409 have further a substantially parallel configuration in relation to the length of the absorption plate 422 in the direction of the y-axis. In some implementations, each arm can be identical in length and can be of the same length as the length of the absorption plate 422 (i.e. L402).

The two arms of both legs 408 and 409 can be defined as inner arms, as the arms closer to the center of the micromechanical pixel 401 and outer arms, as the arms further away from the center. The arms are substantial identical in their shape and geometry. Each arm comprises two regions. The first region is the bimaterial region (the inner bimaterial regions 410 and 411 on leg 408 and 409 respectively, and the outer bimaterial regions 412 and 413 on leg 408 and 409 respectively), includes at least the two base layers. In some implementations, that is namely the structural SiO layer and the metallic layer, and thus is called bimaterial, as described earlier above (the inner thermal isolation regions 414 and 415 on leg 408 and 409 respectively, and the outer thermal isolation regions 416 and 417 on leg 408 and 409 respectively—and both the inner and outer thermal isolation regions are connected with connection element 418 and 419 on leg 408 and 409 respectively). The second region on each arm is the thermal isolation region, comprising mainly of the low thermal conducting structural layer and not including the metallic layer. The length of these regions can be adjusted as described further below. In particular, in the example embodiment of FIG. 8, the outer arms of legs 408 and 409, include bimaterial regions 412 and 413 and thermal isolation regions 416 and 417 respectively. The inner arms of legs 408 and 409, include bimaterial regions 410 and 411 and thermal isolation regions 414 and 415 respectively. All bimaterial regions on legs 408 and 409 are substantially identical in length. All thermal isolation regions on legs 408 and 409 are substantially identical in length and marked with L403. The length of the bimaterial region is of the value of L402-L403. The inner thermal isolation regions 414 and 415 are connected with the outer thermal isolation regions 416 and 417 through connection elements 418 and 419, respectively.

In some implementations, the structural layer thickness of the legs is the same as the structural layer thickness on the absorption plate 422. As mentioned above, this layer is deposited and structured only once in the micro-fabrication process to enable fabrication simplicity. In some implementations, the metallic layer can be about 40 to about 120% of the structural layer's thickness for maximum deflection efficiency, and further can be of the same material and thickness as the reflector material to furthermore enhance fabrication simplicity. In some implementations, a material combination for the inner and outer bimaterial cantilever arms can be SiO—Al, due to the large CTE mismatch of both materials.

The connecting elements 418 and 419 are parts of the legs 408 and 409 respectively, connecting the arms with each other. In some implementations, the connecting elements 418 and 419 can be of identical length and width, for example, between about 1 and about 5 μm and between about 5 and about 15 μm, respectively. In some implementations, the connecting elements 418 and 419 may only include the structural layer. In some implementations, an in-depth profile such as that in the connection elements 420 and 421 can be formed on the connection elements 418 and 419 as well. Also the arrangement of the connection elements to the arms does not need to be substantially perpendicular to the leg's parts and further the connection elements can be rounded or be non-abrupt. The lengths of the connection elements impart a gap between the legs' parts and gap between the leg and the absorption plate. In some implementations, the gap between the leg's parts can be as small as the micro-fabrication tolerances allow. In some implementations, the widths of the various arms of the legs 408 and 409 can be between about 1 and about 10 μm, dependent on the materials' stiffness, the pixel size and the micro-fabrication tolerances.

The thermal isolation regions are responsible for a temperature gradient generation on the structural layer when infrared radiation is absorbed. SiO has a very low thermal conductivity making it a useful material for thermal isolation. A temperature gradient in the structure will result in a tilt of the absorption plate 422 due to the actuation of the inner bimaterial regions 410 and 411. In this case the outer bimaterial regions 412 and 413 have the same temperature as the substrate and the temperature gradient solely declines over the thermal isolation regions. If heat is applied from the substrate then the entire micromechanical pixel's 401 temperature will increase accordingly, actuating both, the inner (410 and 411) and the outer (412 and 413) bimaterial regions of each leg 408 and 409 respectively. Since both inner and outer bimaterial regions arrangements are substantially identical, the net deflection of the absorption plate 422 is substantially zero. This specific leg geometry shown provides for an independency of the absorber plate response upon environmental temperature changes.

The legs 408 and 409 are connected on their top outer ends via the anchor elements 402 and 403 to the substrate elements 406 and 407, respectively. In some implementations, the anchor elements can be long connecting elements of about 15 to about 30 μm length and about 5 to about 15 μm width. The anchor elements are arranged substantially perpendicular to the legs, to enable a highly dense arrangement of micromechanical pixels in y-direction. In some implementations the anchor elements 402 and 403 include both structural and metallic layers, for enabling good thermal conduction to the substrate heat sink via the metallic layer and further the anchor elements 402 and 403 can include an in-depth profile 404 and 405, respectively.

The substrate elements 406 and 407 are parts of a substrate frame, which has been initially solid, of standard semiconductor material, such as, but not limited to silicon and has been patterned in a grill-like arrangement through backside etch.

The legs 408 and 409 and the absorbing plate 422 are not in contact with the substrate and are free standing in order to function accordingly, connected only by the anchor elements to the substrate. The most basic micro-fabrication process to create a micromechanical pixel 401 or a pixel array includes deposition of a structural layer, deposition of a metallic layer, patterning both layers to define the pixel's geometry and pattern the substrate via back side etch to release the pixels. The micromechanical pixel array can be advantageously produced in only three micro-fabrication patterning steps. Alternatively, a front-side patterning of the initial substrate can be performed before the deposition step in order to create the in-depth profile 423 of the micromechanical pixel 401. The order of the patterning steps is not limited to the order described in this example. Also no sacrificial layer is needed to realize a functional free-standing micromechanical pixel 401.

The back-side patterning of the substrate in a grilled-like arrangement, in combination with a substantially perpendicular anchor elements arrangement of the micromechanical pixel 401 allows to release a high-density multi-pixel array configuration, without the usage of a sacrificial layer in the microfabrication process.

In some implementations an etch barrier layer may be deposited prior to the structural layer deposition to support the backside release etch stop on the bottom surface of the micromechanical pixel 401. Such layer can include for example $Al_2O_3$. and is patterned with the patterning of the structural layer, covering the micromechanical pixel's 401 entire bottom surface.

Figure 9:
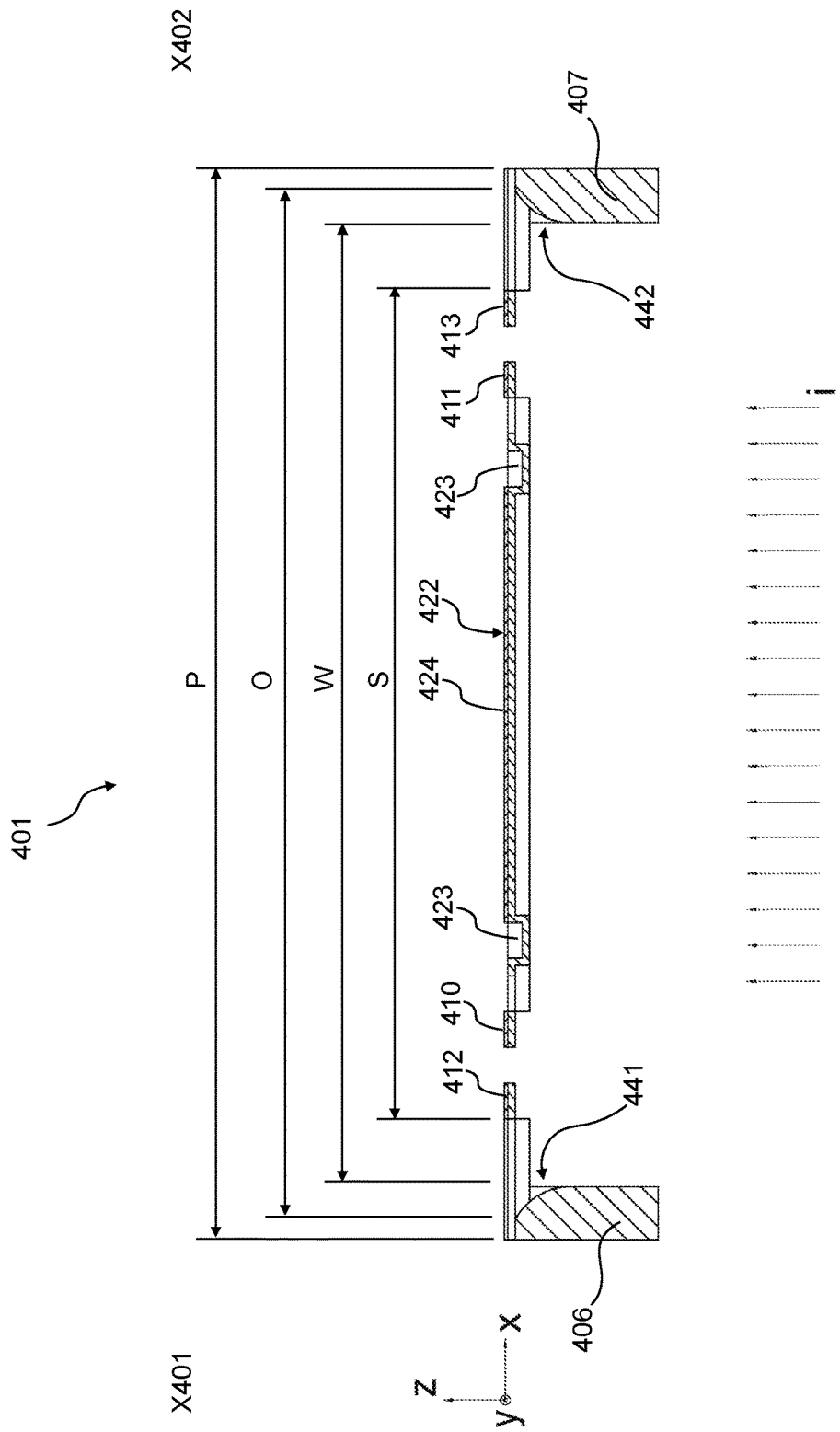
FIG. 9 shows a cross-sectional view of the micromechanical pixel 401 shown in FIG. 8.

FIG. 9 shows a cross-sectional view of the micromechanical pixel 401 shown in FIG. 8. In particular, the cross-section is shown along the lines X401-X402, revealing the cross-sections of the structural and the metallic layers (bottom and top layer, respectively). FIG. 9 also shows the in-depth profile 423 of the absorber plate 422.

The incident IR flux, displayed as i in FIG. 9, falls on the SiO layer from the rear (or bottom, or back-side) of the micromechanical pixel 401. Hence this type of micromechanical pixel's 401 is operating in the so-called "backside irradiation mode". As described earlier above, in some implementations the backside release process can result in a lateral spread at the etch stop surface. This spread is called "notching" and is indicated with 441 and 442 on left and right side respectively. Preferably the top-side opening O is smaller than the pixel pitch P but at least the dimension of the bottom mask opening W. The dimension S indicated the critical structural width that needs to be free-standing, namely the width of both legs and the absorber plate of the micromechanical pixel 401.

Figure 10:
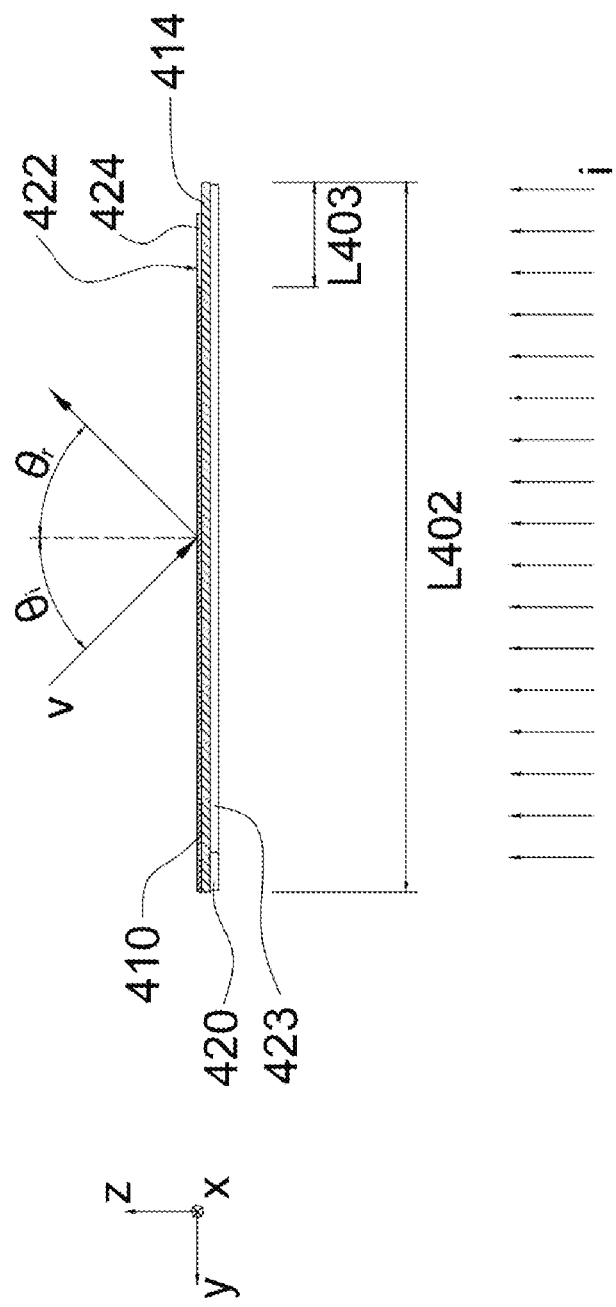
FIG. 10 and FIG. 11 show cross-sectional views of the micromechanical pixel shown in FIG. 8 in two states of operation.
Figure 11:
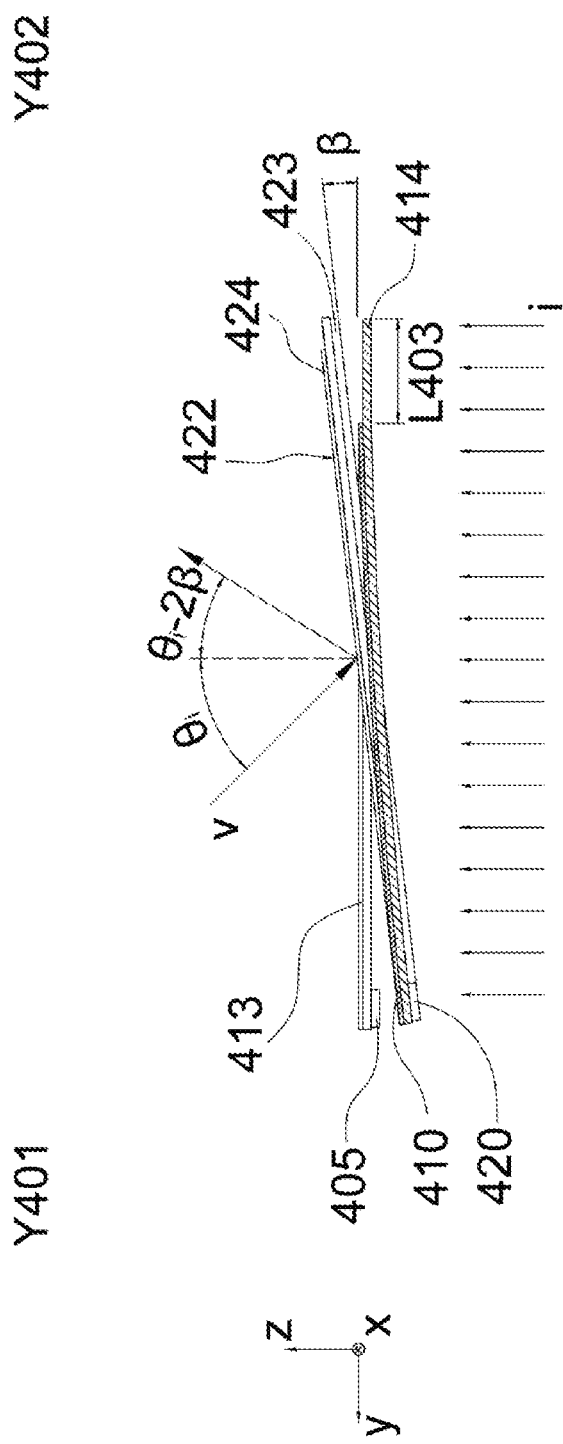

Referring now to FIG. 10 and FIG. 11 a cross-section view of the micromechanical pixel 401 (shown in FIG. 8) is shown along the lines Y401-Y402, where its operational principle is illustrated in two operational modes. In FIG. 10 the micromechanical pixel 401 is schematically displayed in a non-deflected state where IR-flux i has not been absorbed and where the entire micromechanical pixel 401 is in thermal equilibrium. The IR radiation i falls on the pixel from the back side and can be absorbed by the structural layer of the absorber plate. The absorbing plate 422 (shown in FIG. 8) is only partially visible from this perspective. In particular, the in-depth profile 423 and the in-depth profile of the connecting element 420 are visible. Also a part of the reflector 424 is visible in this schematic view. Schematically shown is the readout visible light ray v with the angle of incidence $\theta_i$ and the angle of reflection $\theta_r$ from the normal. The herein defined normal is perpendicular to the reflector 422 plane in a non-elongated state, disregarding of the magnitude of the elongation. The visible light ray can be emitted by a light source, such as, but not limited to a LED and, in some implementations, its position can remain unchanged during operation. In some such implementations, the angle of incidence may remain fixed with respect to the normal during operation. The angle of reflection, however, changes with the absorbing plate's 422 tilt. The reflected light ray can be captured by an electromagnetic light sensor, such as, but not limited to a CCD or a position sensitive device. The displacement of the reflected ray is captured and signal processed. In some implementations, the readout visible light ray v may not be limited to visual light, but can also include e.g. UV or near IR light.

In FIG. 11 the micromechanical pixel 401 is schematically illustrated in a deflected state after infrared radiation i absorption, which generates in illustrated state a sufficient temperature gradient for the inner bimaterial actuators to deflect. The absorbing plate 422 tilts with an angle β out of its initial plane. Thus the angle of reflection changes by the angular amount of 2β, which can be described with $\theta_r=\theta_i-2\beta$. In FIG. 11 the inner bimaterial part 410 is illustrated in its deflected state. As an example embodiment, the aluminum with its higher CTE is the top layer and the SiO with its low CTE is the bottom layer. The tilted absorber plate 422 is visible now behind the inner bimaterial arm, with the reflector area 424 and its in-depth profile 423. From this perspective the right outer arm with its bimaterial region 413, and the right anchor in-depth profile 405 are also visible, all behind the absorber plate from this perspective. For simplicity reasons the substrate is not illustrated in FIGS. 10 and 11.

The thermal isolation region of each arm has the length L403, which is displayed in the cross-section view of FIG. 10 and FIG. 11. The thermal isolation length L403 relatively to the overall arm's length L402, i.e. L403/L402, has a fundamental impact on the performance of the micromechanical pixel 401. Generally, the smaller the thermal isolation region, the faster the micromechanical pixel's 401 response time will be, due to an increase of thermal conductivity. Also, the smaller the thermal isolation region, the larger the bimaterial region will be, resulting in greater bimaterial actuation sensitivity. However, in general, very small thermal isolation regions will result in insufficient temperature gradient generation, hence resulting in low responsivity of the micromechanical pixel 401. Any size of a micromechanical pixel 401 has an optimum L403 length for maximum responsivity.

Figure 12:
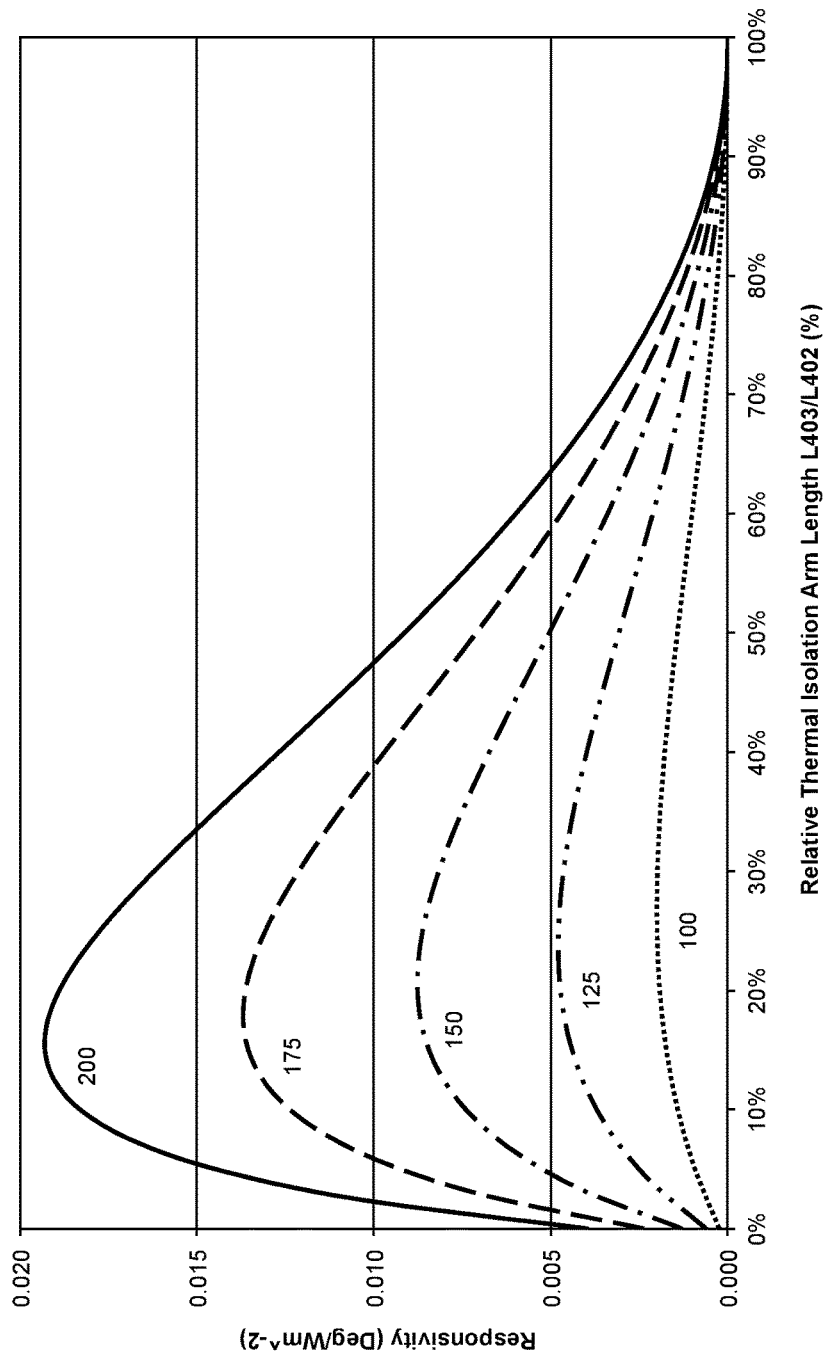
FIG. 12 shows a diagram of the response curve in dependency of the thermal isolation length.

Referring now to FIG. 12, a diagram is shown with exemplary response characteristics for a micromechanical pixel 401 of different pitches P. The indication of the curves represents the pixel size P in micrometers, with the condition of a substantially square pixel design, such as presented in FIG. 8. For example the solid line represents the response characteristic of a 200 μm×200 μm micromechanical pixel 401 with the side length P=200 μm and therefore indicated with "200". Further, the dashed line, indicated with the number "175" represents the response curve of a micromechanical pixel 401 with P=175 μm, the dot-dash lined P=150 μm, etc. Following geometric and material parameters have been used for the calculations of the response curves of the micromechanical pixel 401 as demonstrated in diagram of this embodiment: Gap between any parts (i.e. the connectors length and gap between adjacent pixels) is $w_g=1.25$ μm; width of each leg is $w_l=5$ μm; length of each anchor element is $l_a=12.5$ μm; Thickness of the SiO structural layer is $t_1=500$ nm with following material parameters: thermal conductivity $g_1=1.4$ W/mK; emissivity $\varepsilon_1=0.8$; Young's Modulus $E_1=68$ GPa; CTE $\alpha_1=0.3E-6$ 1/K; Thickness of the Al metallic layer is $t_2=400$ nm with following material parameters: thermal conductivity $g_2=237$ W/mK; emissivity $\varepsilon_1=0.01$; Young's Modulus $E_1=70$ GPa; CTE $\alpha_1=24E-6$ 1/K. The x-axis represents the ratio of L403 to L402 and the y-axis represents the corresponding responsivity that is the resulting absorber/reflector plate tilt to 1 W/m$^2$ irradiated power density, which is absorbed to 80% by the SiO layer ($\varepsilon_1=0.8$). Incident radiation losses, such as through possible IR-optics or radiation windows are not taken into account in these calculations. The responsivity described here is standardized on the irradiance value of 1 W/m$^2$.

As the diagram of FIG. 12 displays, the optimum thermal isolation length for maximum responsivity is for P=200 μm: L403∓30 μm or about 15% with the responsivity of 0.0193°/Wm$^{-2}$; for P=175 μm: L403≈32 μm or about 18% with the responsivity of 0.0137°/Wm$^{-2}$; for P=150 μm: L403≈30 μm or about 20% with the responsivity of 0.0088°/Wm$^{-2}$; for P=125 μm: L403≈29 μm or about 23% with the responsivity of 0.0048°/Wm$^{-2}$; and for P=100 μm: L403≈25 μm or about 25% with the responsivity of 0.0020°/Wm$^{-2}$. The decrease of responsivity in dependence of the pixel scaling results from a smaller effective absorption area, and a shorter bimaterial actuator.

Figure 13:
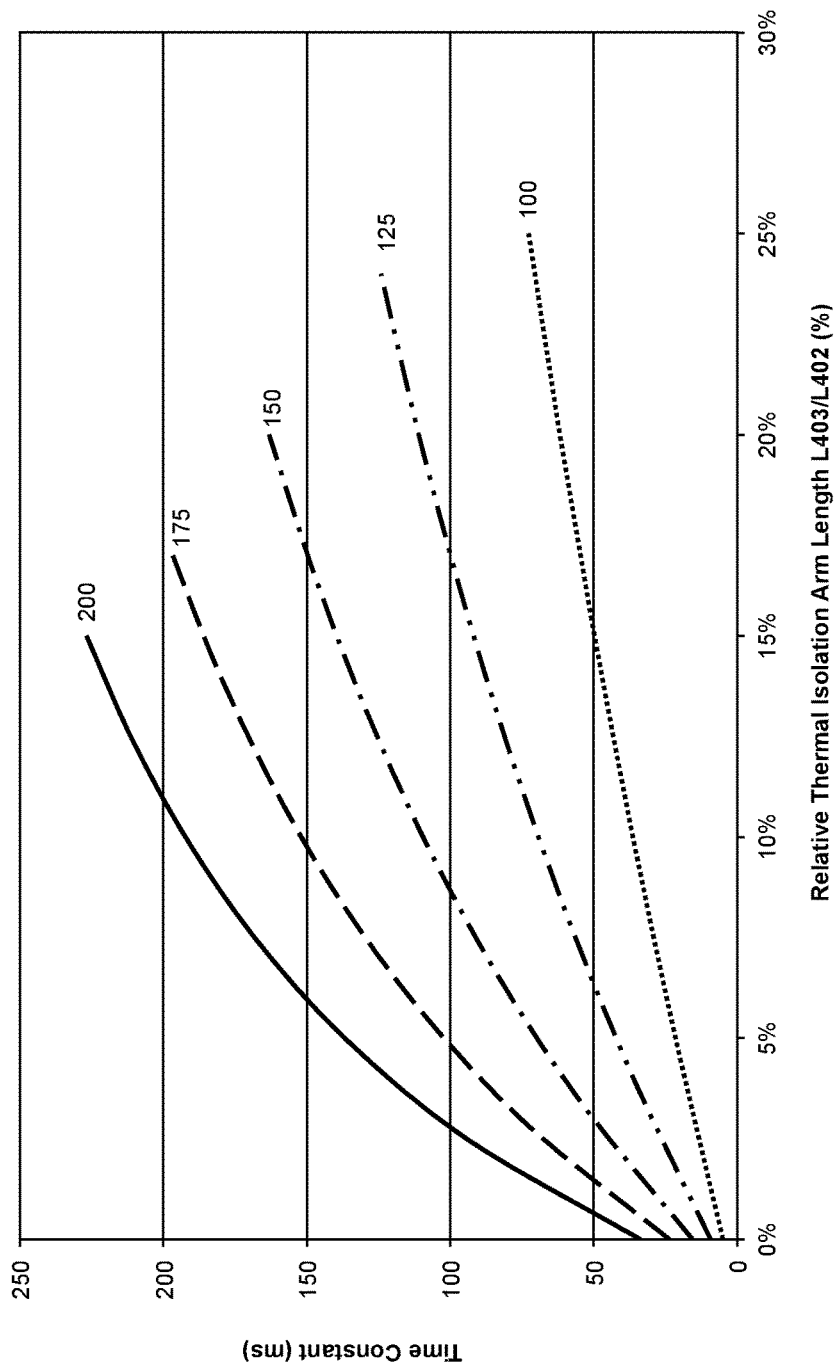
FIG. 13 shows a diagram of the thermal time constant curve in dependency of the thermal isolation length.

Referring now to FIG. 13, a diagram is shown with exemplary thermal time response characteristics for the corresponding micromechanical pixels 401 of different pitches of FIG. 12. The thermal time constant or simply time constant r is defined as the time (here in milliseconds) for the micromechanical pixel 401 to reach the value of (1−1/e) (that is ~63.2%) of its maximum deflection to the incident signal. The detector's imaging frame rate depends strongly on this parameter and typically the observing frames per second (fps) can be defined as fps [(1 . . . 5)*r]$^{-1}$. The diagram of FIG. 13 shows the corresponding time constants from L403/L402=0% up to about the maximum responsivity value (about L403/L402=15 . . . 25%) of each pixel size. The maximum responsivity values possess a time constant (index mr) in milliseconds (ms) of: for P=200 μm: $T_{mr}$≈227 ms; for P=175 μm: 197 ms; for P=150 μm: $T_{mr}$≈163 ms; for P=125 μm: $T_{mr}$≈124 ms; and for P=100 μm: $T_{mr}$≈73 ms.

Often, smaller time constants are desirable for higher fps imaging. The present disclosure offers a simple method to adjust the performance of the sensor to the needs of end users. For example if the aim is high responsivity, then L403 can be defined at its maximum responsivity value as described above. However, if the priority lays on a faster imaging frame rate than the L403 value needs to be smaller than the value of L403/L402 at maximum responsivity. For example, for the pixel size P=150 μm, if L403/L402 is reduced to only about 7% (i.e. L403≈10 μm), then the frame rate doubles (increase of 100%) while the responsivity decreases only about 30%. Numerically expressed: with L403≈10 μm for P=150 μm, the responsivity is 0.006°/Wm$^-$$_2$, with T≈84 ms. This example demonstrates the advantage of the ability to simply adjust the performance of present disclosure through simple geometric means (defining L403).

The ratio of the thermal isolation region to the overall arm's length can be used to adjust the micromechanical pixel's 401 performance.

Each leg of the micromechanical pixel 401 is formed in a "U"-shape and consists of only 2 arms. In general, the longer the overall leg's length, the lower the pixel's resonant frequency will be, because the micromechanical pixel forms a simplified spring/mass model with the long legs being the spring and the absorber plate the mass. An advantage of the micromechanical pixel 401, including only two parallel arms is that its resonant frequency is higher than compared to a micromechanical pixel of same dimensions and created of same materials with for example 3 or 4 arms in each leg. An increased resonance may allow the usage of such sensor for applications with increased dynamical and shock loads, for example in automobiles, airplanes, helicopters, drones, weapons, but also in handheld devices and/or utilities. Ultimately, the resonant frequency and the potential usage of the micromechanical pixel 401 under high dynamic load depend on its size, geometric and material properties.

Further, because the micromechanical pixel 401 comprises legs with only two arms each, its absorber/reflector plate 422 can be wider, compared to a micromechanical pixel of same features, dimensions and materials but comprising 3 or 4 legs. A wider absorber plate 422 can be advantageous for allocating different shapes of reflectors that are bound to minimum dimensional features because of the optical readout system. In some implementations maximum possible reflector sizes are desired to reduce divergence of the reflected light paths and therefore to increase the complexity and increase sensitivity of the optical readout system. For example, for a pixel pitch P=150 µm, anchor length of 15 µm, leg-width of 4 µm and gap-width of 1 µm, the maximum possible absorber width can be 100 µm for a micromechanical pixel 401 including only 2 arms on each leg. In contrast, a micromechanical pixel of same geometrical constraints including 4 arms on each leg, can have a maximum absorber width of only 80 µm. The larger reflector (e.g. diameter of 100 µm instead of 80 µm) will have a smaller reflected readout light divergence—resulting in less complex requirements of the readout system.

Figure 14:
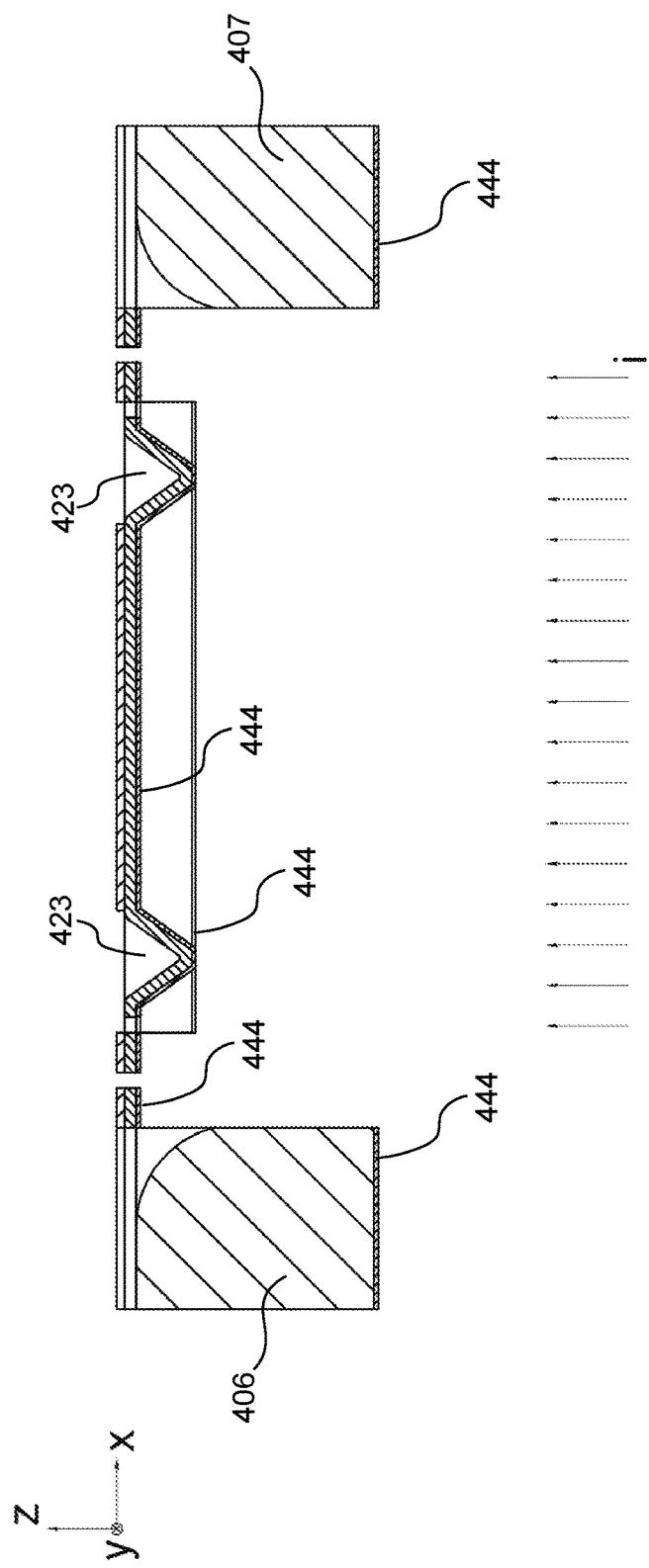
FIG. 14 shows a cross-sectional view of another example micromechanical pixel.

Referring now to FIG. 14, another cross sectional view of an exemplary alternative design of the micromechanical pixel 401 is shown, similar to the cross section view of FIG. 9. In particular, FIG. 14 shows an alternative structure of, and process of manufacturing of a micromechanical pixel, by way of including a final backside deposited absorption layer 444 after the backside pixel release. The absorption layer 444 is plainly deposited on the back surface and is not structured at all. The purpose of this additional layer is to include an enhanced absorption and/or anti-reflection property to the micromechanical pixel 401 for the detectable radiation wavelengths. In some implementations, absorbing layers are ultra-thin films (example thicknesses below 30 nm) of e.g. titanium nitrade or nichrome, which can form free-space absorbers. Such ultra-thin films can enhance the pixel's absorption, resulting in an enhancement of responsivity. In some implementations, the absorption layer can consist of a broadband absorber, such as, but not limited to black-gold, black-carbon, etc.

Also, the micromechanical pixel 401 shown in FIG. 14, compared to FIG. 9, has a V-shaped in-depth profiles 423, on the absorber plate 422. The profile depth is not limited and can be as deep as required to prevent stress-induced and thermo-mechanical-induced deformations. In some implementations, the V-shaped in-depth profiles 423 can be formed using anisotropic silicon wet etch technique.

Another difference of the micromechanical pixel 401 of FIG. 14 compared to FIG. 9 is that the substrate elements 406 and 407 have increased widths and increased thicknesses compared to that of the implementation shown in FIG. 9. However, in general, the thicknesses and proportion ratios are not necessarily drawn to scale in any figures. The purpose of this example is purely to demonstrate the possibility of variable and alternative sizes and dimensions of the micromechanical pixel 401.

The opening width O on the substrate's frontside needs to be larger than the micromechanical pixel's structural freestanding width S, which includes the absorber plate and both legs. It should be noted that the dimensions "O, P, S, and W" are only shown in FIG. 9, but also apply to the cross section FIGS. 14 and 15. For functional operation of the micromechanical pixel 401 the absorbing area and both legs of the micromechanical pixel 401 are configured to be free standing, i.e. not in contact with the substrate. The elements of the pixel that are connected to the substrate rails 406 and 407 are the anchor elements 402 and 403 respectively, which are designed substantially perpendicular to the legs to connect the pixel to the substrate rails 406 and 407. In some implementations, the backside release opening width W can be larger than the dimension S, which is the overall width of the absorbing area together with the legs width, to ensure that these elements are free standing if assuming a vertical etch profile. This case is demonstrated, for example, in FIG. 15 where W>S. In some implementations however the backside release opening width W may be substantially equal or even smaller than S. In such case notching can be used to under etch parts of the micromechanical pixel to create a top-side opening O that is larger than S.

In some implementations an additional absorption layer can be deposited before or after the structural layer deposition, and further can be structured through a photolithographic process. In some implementations, if deposited prior to the structural layer deposition, the absorption layer can function in addition to radiation absorption enhancement as an etch barrier for the backside release process. In some implementations, more than one layer may be used as an absorption layer and/or etch barrier layer.

Figure 15:
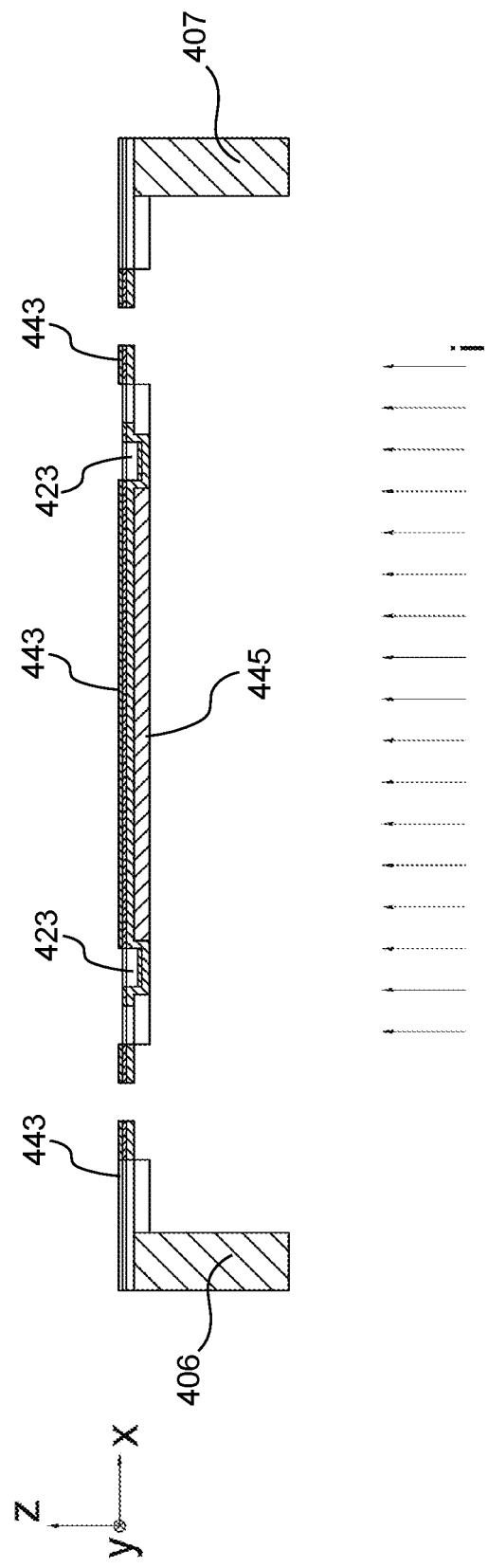
FIG. 15 shows a cross-sectional view of yet another example micromechanical pixel.

Referring now to FIG. 15, yet another cross sectional view of an exemplary alternative design of the micromechanical pixel 401 is shown, similar to the cross section views of FIGS. 9 and 14. In particular, FIG. 15 shows an alternative structure of, and process of manufacturing of a micromechanical pixel, by way of including a structured absorption layer 445 and an unstructured front side deposited conduction layer 443. The general purpose of the conduction layer is to reduce the thermal time constant of pixel 401 through conducting layer deposition. In some implementations, the conduction layer may be applied post-release.

Figure 16:
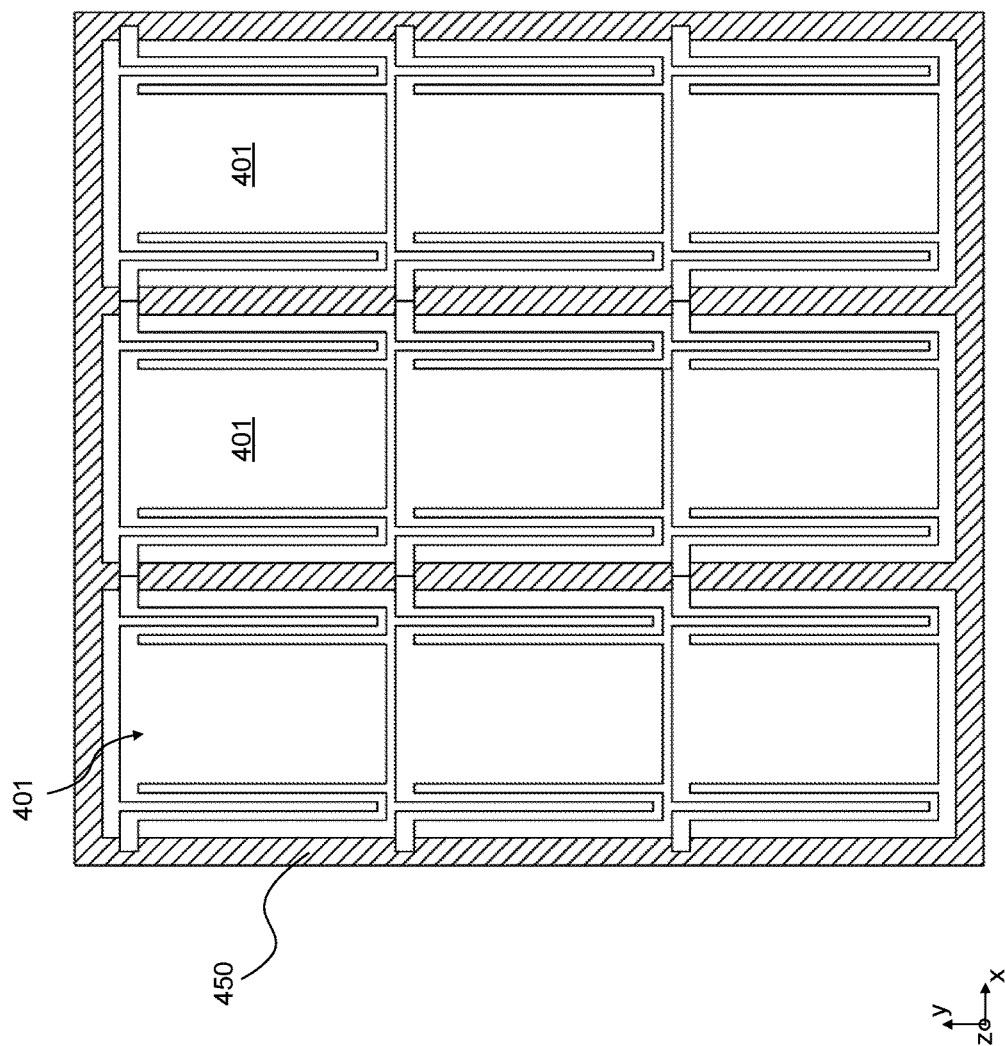
FIG. 16 shows an example micromechanical pixel focal plane array including an arrangement of 3 by 3 single micromechanical pixels as shown in FIG. 8.

Referring now to FIG. 16, a micromechanical pixel 401 focal plane array comprising an arrangement of outlines of 3 by 3 single micromechanical pixels 401 is schematically shown. For simplicity purposes, only the outlines of micromechanical pixel 401, including no greater detail, are shown in the array configuration example embodiment of FIG. 16. In some implementations, the distance between the center of one micromechanical pixel 401 to the center of its side-neighboring micromechanical pixel 401 can be substantially equal in the plane. The substrate 450 is patterned beneath the absorbing area and the legs of the micromechanical pixels 401. Hence the patterning has a grill-like arrangement. The openings are aligned with the micromechanical pixels in order to realize free-standing elements. The example shown in FIG. 16 is only one example of a micromechanical pixel array. The number of micromechanical pixels 401 in an array is not limited to that shown in FIG. 16, and the array need not have an equal number of rows and columns. In some implementations, the substrate patterning in the grill-like arrangement can be substantially parallel to the long side of the micromechanical pixel 401. A substrate frame 450 of optional width surrounds the outer pixels of the array.

In some implementations, the substrate frame 450 can be used as a contact surface for bonding a cavity cap on the front surface of the micromechanical pixel array. The cavity cap can include cavities of adjusted shape and depth to protect the front side of the micromechanical pixel's 401. Further it can be of optically transparent material such as quartz or fused silica for the visual read out light ray to pass through and function accordingly as described above. In some implementation a vacuum packaging of the micromechanical pixel array may be required. In such case a cavity cap can be bonded on the front side and a plane optical window can be vacuum bonded on the backside of the micromechanical pixel array's substrate after the pixel release. The application or bonding of the cavity cap can be realized before the backside etch pixel release.

Referring now to FIG. 17, another example of a micromechanical pixel 401 is shown. In this example embodiment the proportions of the micromechanical pixel are different to the one example in FIG. 8. Further, the example in FIG. 17 has the absorber plate not attached on its corners, such as in FIG. 8, but in about the centers of its long sides. In some implementations, the width of all connecting elements can be larger for a mechanically more stable structure. In some implementations, the length of the anchors can be smaller. Due to a more compact configuration the absorption plate 422 in this example embodiment can be wider in its proportions than the absorption plate in example embodiment shown in FIG. 8.

The example embodiment of FIG. 17 includes an alternative in-depth profile design 429 and 430 of the absorbing plate 422. This example further demonstrates variations of different in-depth designs for rigidity enhancements of designated regions of the absorber plate. The additional in-depth profile can be of any shape or geometry in order to provide desired rigidity.

The micromechanical pixel 401 of the example embodiment of FIG. 17 also includes a different reflector 424 shape, which is round instead of a rectangular shape as of the example embodiment shown in FIG. 8. The reflector shape is not limited to a certain geometry and can be configured according to the optical read out mechanism requirements.

Referring now to FIG. 18, another example of a micromechanical pixel 401 is shown in a perspective view and yet of different proportions. The example embodiment of FIG. 18 does not contain any in-depth profile and includes only a structural layer and metallic layer.

Various other embodiments are now described below. In one embodiment, a micromechanical radiation sensor comprises:

(i) an absorber/reflector plate including: a structural layer including a radiation absorbing material, and a light reflecting layer including a light reflecting material, deposited over the structural layer;

(ii) two substantially parallel and substantially identical supporting legs attached to the absorber/reflector plate, each of the supporting legs including: two substantially parallel arms of substantially identical length, connected with each other at one end, and each of the arms including a bimaterial region, including the structural layer and a light reflecting layer, deposited over the structural layer, wherein the bimaterial region is of same length or of shorter length than the overall arm's length, and in the case of a bimaterial region length being shorter than the overall arm's length, the arm including a thermal isolation region comprising the structural layer and being devoid of the light reflecting layer; and (iii) two substantially identical anchors, each of the anchors attached substantially perpendicular to each of the supporting legs, the two anchors connecting the absorber/reflector plate through the two supporting legs to a substrate.

In one embodiment, the structural layer has a coefficient of thermal expansion that is smaller than the coefficient of thermal expansion of the light reflecting layer.

In one embodiment, the structural layer has a thermal conductivity that is smaller than the thermal conductivity of the light reflecting layer.

In one embodiment, the absorber/reflector plate includes ribs along at least one of its sides.

In one embodiment, each of the two anchors include ribs along its length.

In one embodiment, each of the two anchors include the structural layer and the light reflecting layer.

In one embodiment, each supporting leg includes two arms, wherein one end of one of the arms is attached to the anchor and the other end of same arm is attached to the other arm, and the other arm is attached at its other end to the absorber/reflector plate, forming a shape that can be described as a "U".

In one embodiment, the bimaterial regions on all four arms are substantially identical in length and width.

In one embodiment, each supporting leg includes two arms wherein each arm includes a substantially identical length and width of the bimaterial region and a substantially identical length and width of the thermal isolation region.

In one embodiment, the micromechanical sensor includes an adhesion layer disposed between the structural layer and the light reflecting layer.

In one embodiment, the structural layer has a thickness of about 50 nm to about 5000 nm.

In one embodiment, the optical reflecting layer has a thickness of about 40 to about 120% of the structural layer.

In one embodiment, the structural layer is silicon oxide or silicon dioxide and the light reflecting layer is aluminum or gold.

In one embodiment, the absorber/reflector plate and the two supporting legs are free standing, hence not in contact with the substrate.

In one embodiment, the absorber/reflector plate and the two supporting legs are released by substrate etch without the usage of sacrificial layers.

In one embodiment, the substrate release pattern is forming a column opening arrangement that is substantially perpendicular to the axis of rotation of the micromechanical pixel, in order to allow a dense arrangement of micromechanical sensors in column direction, and the two legs and the absorber/reflector plate of the micromechanical sensors are connected to the patterned substrate via the two anchors that are positioned parallel to the axis of rotation of the micromechanical pixel.

In a first embodiment, a fabrication process for the micromechanical sensor includes the patterning of the substrate to form the shape and geometry of the in-depth ribs, the deposition of and the patterning of the structural layer, the deposition of and the patterning of the light reflecting layer and ultimately the patterning of the substrate to release the micromechanical sensor.

In a second embodiment, a fabrication process for the micromechanical sensor includes the patterning of the substrate to form the shape and geometry of the in-depth ribs, the deposition of the structural and subsequently the deposition of the light reflecting layer, the patterning of both layers and ultimately the patterning of the substrate to release the micromechanical sensor. In either of the first or second fabrication process embodiments above, an etch barrier layer may be deposited prior the structural layer deposition.

In one embodiment, the micromechanical sensor includes a conducting layer, which has a higher thermal conductivity than the structural layer, wherein the conducting layer is deposited before or after the sensor release, on the front surface or the back surface or on both surfaces of the sensor.

In one embodiment, the micromechanical sensor includes a conducting layer, which has a higher thermal conductivity than the structural layer, wherein the conducting layer is deposited and subsequently patterned.

In one embodiment, the micromechanical sensor further includes a single or multiple light absorbing layers beneath and/or on top of the absorber/reflector plate.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A micromechanical radiation sensor, comprising:
a substrate having: a first direction; and a second direction that is perpendicular to the first direction; and
at least one column of micromechanical pixels, wherein the micromechanical pixels in the column are arranged along the first direction, the respective micromechanical pixel having:
a plate having a layer of a radiation absorbing material and a layer of a light reflecting material, wherein the layer of the light reflecting material is coated on a surface of the layer of the radiation absorbing material that is configured as a structure layer; and
two legs arranged in symmetry with respect to an axis of symmetry and causing the plate to rotate about an axis of rotation;
wherein each respective leg of the two legs having one first end joining the substrate and a second end joining the plate on a respective edge of the plate, the respective leg having:
two straight outer arms, each having a bimaterial region extending along the first direction, wherein the bimaterial region having a length in the first direction longer than half of a length of the plate in the first direction; and
a thermal isolation region coupled in parallel between the two straight outer arms wherein the thermal isolation region extends in the first direction by a length that is shorter than half of the length of the plate in the first direction; and
wherein a dividing line between plates of adjacent micromechanical pixels in the column goes through center portions of legs of one of the adjacent micromechanical pixels.

2. The micromechanical radiation sensor of claim 1, wherein the plate further has an additional structured absorption layer.

3. The micromechanical radiation sensor of claim 1, wherein the biomaterial region includes a structural layer and a metallic layer; and the metallic layer is of a thickness different from the layer of the light reflecting material of the plate.

4. The micromechanical radiation sensor of claim 1, wherein the two straight outer arms of the respective leg and the plate having a same length along the first direction.

5. The micromechanical radiation sensor of claim 1, wherein the bimaterial region includes a layer of the radiation absorbing material.

6. The micromechanical radiation sensor of claim 5, wherein the bimaterial region further includes a layer of the light reflecting material.

7. The micromechanical radiation sensor of claim 6, wherein the radiation absorbing material is silicon oxide or silicon dioxide, and the light reflecting material is aluminum or gold.

8. The micromechanical radiation sensor of claim 1, wherein a dimension of the respective leg in the first direction is equal to the length of the plate in the first direction.

9. The micromechanical radiation sensor of claim 1, wherein a dimension of the respective leg in the first direction is longer than the length of the plate in the first direction.

10. The micromechanical radiation sensor of claim 1, wherein the thermal isolation region of the respective leg has two inner arms of the radiation absorbing material, the inner arms extending in the first direction.

11. The micromechanical radiation sensor of claim 10, wherein the inner arms of the respective leg are shorter in the first direction than the length of the outer arms of the respective leg.

12. The micromechanical radiation sensor of claim 11, wherein the inner arms of the respective leg occupy a space between the outer arms of the respective leg.

13. The micromechanical radiation sensor of claim 11, wherein inner arms of a first one of the adjacent micromechanical pixels in the column occupy a space between two outer arms of a second one of the adjacent micromechanical pixels.

14. The micromechanical radiation sensor of claim 1, wherein each of the two straight outer arms of the respective leg further has a thermal isolation region extending along the first direction.

15. The micromechanical radiation sensor of claim 1, wherein a shape of the plate is defined by the layer of the radiation absorbing material and a layer of light reflecting material; and the layer of the light reflecting material does not cover no more than a portion of a side of the plate defined by the layer of the radiation absorbing material.

16. A micromechanical radiation sensor, comprising:
a substrate having:
a first direction; and
a second direction that is perpendicular to the first direction; and
a structure layer for at least one column of micromechanical pixels, the micromechanical pixels in the column arranged along the first direction, wherein for each respective micromechanical pixel in the column the structure layer having:
a plate portion; and
two leg portions;
wherein the respective micromechanical pixel has:
   a layer of a light reflecting material covering a portion of the plate portion in the structure layer to form a plate of the respective micromechanical pixel, wherein the layer of the light reflecting material is coated on a surface of the plate portion; and
   a metallic layer attached to bimaterial regions of the two leg portions, wherein regions of the two leg portions not covered with the metallic form thermal isolation regions between the bimaterial regions;
wherein the two leg portions and the metallic layer define two legs that are arranged in symmetry with respect to an axis of symmetry, the two legs causing the plate to rotate about an axis of rotation;
wherein each respective leg of the two legs having one first end anchored to the substrate and a second end anchored to the plate on a respective edge of the plate, the respective leg having:
   two straight outer arms, each having at least a bimaterial region extending along the first direction, wherein the bimaterial region having a length along the first direction longer than half of a length of the respective micromechanical pixel along the first direction; and
   a thermal isolation region coupled in parallel between the two straight outer arms, wherein the thermal isolation region extends in the first direction by a length that is shorter than half of the length of the respective micromechanical pixel along the first direction; and
wherein a dividing line between plates of adjacent micromechanical pixels in the column goes through center portions of outer arms of legs of one of the adjacent micromechanical pixels.

17. The micromechanical radiation sensor of claim 16, wherein the plate further has an additional structured absorption layer.

18. The micromechanical radiation sensor of claim 16, wherein the metallic layer is of the light reflecting material.

19. The micromechanical radiation sensor of claim 16, wherein the bimaterial region extending along the first direction in each of the two straight outer arms has a length equal to the length of the plate in the first direction.

20. The micromechanical radiation sensor of claim 19, wherein the thermal isolation region coupled between the two straight outer arms includes two straight inner arms extending the first direction; the two straight inner arms having a same length that is shorter than the length of the plate in the first direction.

* * * * *